United States Patent
Kamei et al.

(10) Patent No.: US 6,944,359 B2
(45) Date of Patent: Sep. 13, 2005

(54) OPTICAL FIBER PHOTOELECTRIC SENSOR UNIT

(75) Inventors: Takashi Kamei, Maizuru (JP); Hiroyuki Inoue, Fukuchiyama (JP); Kiyohiko Gondo, Fukuchiyama (JP); Shinichiro Iura, Fukuchiyama (JP); Kizuku Fujita, Ayabe (JP); Yoshinori Kawai, Ayabe (JP)

(73) Assignee: Omron Corporation, Kyoto (JP)

( * ) Notice: Subject to any disclaimer, the term of this patent is extended or adjusted under 35 U.S.C. 154(b) by 0 days.

(21) Appl. No.: 10/695,652

(22) Filed: Oct. 29, 2003

(65) Prior Publication Data

US 2005/0094920 A1 May 5, 2005

(30) Foreign Application Priority Data

Oct. 31, 2002 (JP) .................................. P2002-319152
Nov. 28, 2002 (JP) .................................. P2002-346446

(51) Int. Cl.⁷ .......................... G02B 6/42; H04B 10/08; G09F 9/33
(52) U.S. Cl. ............................ 385/12; 385/88; 385/92; 250/221; 398/25; 340/815.45
(58) Field of Search ............................. 385/12, 88–94; 398/9–38, 151; 250/221

(56) References Cited

U.S. PATENT DOCUMENTS

| | | | | |
|---|---|---|---|---|
| 5,347,117 A | * | 9/1994 | Fooks et al. | 250/221 |
| 5,808,296 A | * | 9/1998 | McMonagle et al. | 250/221 |
| 6,492,650 B1 | * | 12/2002 | Imai et al. | 250/551 |
| 6,555,806 B2 | * | 4/2003 | Okamoto | 250/221 |
| 6,692,311 B1 | * | 2/2004 | Kamei et al. | 439/716 |
| 6,717,515 B1 | * | 4/2004 | Osako et al. | 340/540 |
| 6,803,556 B2 | * | 10/2004 | Sugiyama | 250/214 A |

FOREIGN PATENT DOCUMENTS

| | | |
|---|---|---|
| JP | 06-153270 | 5/1994 |
| JP | 7-301733 | 11/1995 |
| JP | 2001-022786 A | 8/2001 |
| JP | 2002-279871 A | 9/2002 |
| WO | WO 01/31607 A1 | 5/2001 |

\* cited by examiner

*Primary Examiner*—Akm Enayet Ullah
*Assistant Examiner*—Jerry T Rahll
(74) *Attorney, Agent, or Firm*—Foley & Lardner LLP

(57) ABSTRACT

An optical fiber photoelectric sensor unit comprising: two sets of light-emitting and light-receiving circuits corresponding to a first and second detection channels; a single CPU which performs detecting operations of the two detection channels by time sharing; two output lines corresponding to the two detection channels; four fiber inlets aligned vertically on the front surface, a first and second digital display parts which each display a string of digits in the longitudinal direction of the case and which are aligned on the top surface in the longitudinal direction of the case.

12 Claims, 22 Drawing Sheets

Fig. 7B   rear view

Fig. 7A   front view (left-hand view)  (right-hand view)

— display forms —

(201) (202)
first digital display part    second digital display part

— description of display forms —

Fig. 16A  <the amount of received light + the amount of received light> display
first display part       : the amount of received light in 1 CH
second display part : the amount of received light in 2 CH

Fig. 16B  <the amount of received light + threshold value> display
first display part       : the amount of received light in 1 CH
second display part : threshold value in 1 CH
(channel selection SW: 1-CH side)

Fig. 16C  <the amount of received light + threshold value> display
first display part       : the amount of received light in 2 CH
second display part : threshold value in 2 CH
(channel selection SW: 2-CH side)

Fig. 16D  <bar> display
first display part       : light-entering side in each CH
second display part : light-shading side in each CH

Fig. 16E  <the amount of received light difference value + threshold value> display
first display part       : the amount of received light in 1 CH
 – the amount of received light in 2 CH
second display part : difference threshold value
(channel selection SW: 2-CH side)

Fig. 18

|   | process | process description |
|---|---------|---------------------|
| 1 | initial setting process | • The memories, indicator lights, and control outputs are initialized.<br>• The readout of necessary items from EEPROM and data checking are performed. |
| 2 | SET mode initial setting process | • The SET mode setting value is initialized.<br>• The function number F (F=0) is initialized. |
| 3 | SET mode process | • SET mode process is executed. |
| 4 | RUN mode initial setting process | • The indicator lights and control outputs are initialized.<br>• The threshold value and RUM mode setting values are initialized.<br>• The light-emitting and light-receiving channel number C (C=1) is initialized. |
| 5 | RUN mode process | • RUN mode process is executed. |

Fig. 19

|   | process | process description |
|---|---------|---------------------|
| 1 | function-specific display process | • The indicator lights are controlled and display is performed according to the set function number (F). |
| 2 | key input detection | • Key input detection is performed at the regular time intervals and when a key input has been detected, a setting is performed to execute the appropriate process. |
| 3 | function-specific execution process | • The process according to the set function number (F) is executed.<br>• When individual setting for each channel is possible, the state of the channel selection switch is detected and the process is applied the corresponding channel. |

Fig. 20

| F | item | function description | the capability or incapability of the individual setting for each channel (*) |
|---|---|---|---|
| 0 | teaching | • Various types of teaching are performed according to the key input and a threshold value is determined.<br>[types of teaching]<br>teaching without work, teaching with work, maximum sensitivity setting, etc. | O |
| 1 | operation mode setting | • operation mode setting is performed<br>    L. ON : light-entering ON<br>    D. ON : light-shading ON | O |
| 2 | detection function setting | • the detection function is selected.<br>The detecting algorithm at the time of determining between ON and OFF differs depending the selected contents of this function.<br>[detecting functions]<br>    standard mode, top-speed mode, high precision mode, etc. | x |
| 3 | timer function setting | • a timer mode and a timer are set.<br>Through these settings, the output timing at the time of determining between ON and OFF is set.<br>[timer mode] timer off, off delay, on delay, one shot<br>[time set by the timer] the time is set within the permissible range, besides the timer off. | O |
| 4 | a display content setting | • A display content is selected.<br>[display contents] the amount of received light, threshold value, bar display, etc.<br>(*) These display contents can be displayed in combination<br>(*) The hold value (peak, bottom, etc.) of each content is possible. | x |
| 5 | key function assignment setting | • The role of the key in the RUM mode is selected.<br>[key assignment] power tuning, zero reset, etc. | x |
| 6 | power tuning target value setting | • The target value at the execution of power tuning is set. | x |
| 7 | display direction setting | • A display direction is selected.<br>    normal : normal direction display<br>    reverse : reverse direction display | x |
| 8 | output content setting | • The output content of the second channel in the two-output model is set.<br>[output contents] normal independent output, AND output, OR output, difference output | x |

(*) Concerning the item which can be individually set for each channel, the process is executed only to the corresponding channel by detecting the state of the channel selection switch during the execution.

(*) The "difference output" in the "output setting content" in F=8 is determined by "(the amount of received light in 1 CH) − (the amount of received light in 2 CH)".

Fig. 21

| | process | process description |
|---|---|---|
| 1 | indicator light control | • The illumination of the 7-segment display device is controlled according to the designated display content. |
| 2 | communication command execution | • When a communication command is received in the instrumentation interrupt process, the appropriate command is processed. |
| 3 | APC | • The monitoring amount of received light acquired in the instrumentation interrupt process is monitored and APC (auto power control: power control of the light-emitting current) amendment is applied at the regular time intervals.<br>• The amendment process is executed from channel to channel. |
| 4 | key input detection | • Key input detection is performed at the regular time intervals and when a key input has been detected, a setting is performed to execute the appropriate process. |
| 5 | channel switching | • A designating channel is selected according to the key input. |
| 6 | threshold value adjustment | • The threshold value is changed according to the key input<br>• The process is applied to the designated channel. |
| 7 | power tuning | • The light-emitting power and the light-receiving gain are optimized so as to acquire the target detection value (power tuning execution).<br>• When "power tuning release" has been requested, the light-emitting power and the light-receiving gain in default are resumed (power tuning release).<br>• The process is applied to the designated channel. |
| 8 | zero reset | • The amount of received light at the starting point is so determined that the amount of received light display at present becomes "0". Hereafter, the amount of change from the amount of received light at the starting point is displayed as the amount of received light. The threshold value is shift-displayed in the same manner according to the amount of received light at the starting point (zero reset execution).<br>• When the "zero reset release" has been requested, the amount of received light display in default is resumed (zero reset release).<br>• The process is applied to the designated channel. |
| 9 | key locking | • "key locking" is set (when "key locking" has been set, key inputs other than a specific key input are rejected).<br>• When "key locking release" has been requested, the locking is released. |

Fig. 22

| | process | process description |
|---|---|---|
| 1 | synchronous communication | • A light-emitting synchronous signal is transmitted to the adjacent sensor unit. |
| 2 | 1-CH light-emitting and light-receiving | • Illumination control of the 1-CH light-emitting LED is performed according to the set detection mode, and the amount of received light obtained is converted to an electric signal and amplified, and then A/D conversion is executed so as to acquire the detection value. The detection value thus obtained is used for the display in the 1-CH ON/OFF determination process or the RUN mode process. |
| 3 | 1-CH ON/OFF determination | • The acquired detection value is compared with the threshold level so as to perform the 1-CH ON/OFF determination according to the set detection function, timer mode and operation modes (L. ON/D. ON). |
| 4 | 1-CH output control | • Output control of the 1-CH control output and illumination control of the operation indicator light are performed according to the 1-CH ON/OFF condition. |
| 5 | 2-CH light-emitting and light-receiving | • Illumination control of the 2-CH light-emitting LED is performed according to the set detection mode, and the amount of received light obtained is converted to an electric signal and amplified, and then A/D conversion is executed so as to acquire the detection value. The detection value thus obtained is used for the display in the 2-CH ON/OFF determination process or the RUN mode process. |
| 6 | 2-CH ON/OFF determination | • The acquired detection value is compared with the threshold level so as to perform the 2-CH ON/OFF determination according to the set detection function, timer mode and operation modes (L. ON/D. ON). |
| 7 | difference determination | • The value obtained by subtracting the amount of received light of 2 CH from the amount of received light of 1 CH is compared with the threshold level so as to perform the 2-CH ON/OFF determination according to the timer mode and operation modes (L. ON/D. ON). |
| 8 | 2-CH output control | • Output control of 2-CH control output and illumination control of the operation indicator light are performed according to the output content setting in the SET mode.<br>(output content setting)<br>  • normal independent output ... the results of the 2-CH ON/OFF determination are outputted<br>  • AND output ... the AND output of the results of the 1-CH ON/OFF determination and the 2-CH ON/OFF determination<br>  • OR output ... the OR output of the results of the 1-CH ON/OFF determination and the 2-CH ON/OFF determination<br>  • difference output ... it is outputted according to the results of the difference determination |
| 9 | command communication | • When a command communication is received through communication, the received contents are stored and the command is forwarded to the adjacent sensor unit. |

OPTICAL FIBER PHOTOELECTRIC SENSOR UNIT

BACKGROUND OF THE INVENTION

1. Field of the Invention

The present invention relates to an optical fiber photoelectric sensor unit which can be linked contiguously and closely with other units via an attachment rail such as a DIN rail, and more specifically relates to an optical fiber photoelectric sensor unit which can be preferably linked with a large number of other units in a small area.

2. Description of the Prior Art

There is an already known optical fiber photoelectric sensor unit which can be linked with a large number of other units via a DIN rail and which includes one set of light-emitting and light-receiving fibers, one set of light-emitting and light-receiving circuits, and one output line (See Patent Document 1).

There is another already known optical photoelectric sensor unit in which a sensing system circuit that realizes an intended sensing function by being linked with the fiber head; a first optical communication system circuit that includes a light-emitting and light-receiving elements to perform a bi-directional optical communication with the adjacent sensor unit on one side when plural sensor units are contiguously linked; and a second optical communication system circuit that includes a light-emitting and light-receiving elements to perform a bi-directional optical communication with the adjacent sensor unit on the other side when plural sensor units are contiguously linked, and these three circuits are accommodated in a housing which enables the photoelectric sensor unit to be linked with a large number of other units via a DIN rail, whereby a bi-directional optical communication can be conducted with the adjacent sensor units on both sides in the condition where the photoelectric sensor unit is contiguously linked with other units (See Patent Document 2).

There is further another already known optical fiber photoelectric sensor unit which tries the handshake processing with its adjacent sensor units on both sides when linked with other units by means of the first and second communication system circuits to learn its own position in the plural sensor units linked together, assigns the learned inherent address, generates the timing of the sensing action inherent to its position and drives the sensing system circuits according to the timing of the sensing action to attain its sensing action. Meanwhile, the sensor unit has a data selection/transfer function to transfer the data received from the adjacent sensor unit on one side to the adjacent sensor unit on the other side excluding the data that are addressed to its own unit during the intervals of sensing actions and also has another function to carry out the commands included in the data addressed to its own unit (See Patent Document 3).

There is further another already known optical fiber photoelectric sensor unit which is provided with plural detection channels. The front surface of the sensor unit includes a pair of vertically aligned light-emitting and light-receiving optical fiber inlets corresponding to one detection channel, and such a pair of light-emitting and light-receiving optical fiber inlets are laterally arranged the same number as the detection channels (Patent Document 4).

[Patent Document 1]
Japanese Laid-open Patent Application No. 2002-279871
[Patent Document 2]
International Publication No. 01/31607
[Patent Document 3]
Japanese Laid-open Patent Application No. 2001-222786
[Patent Document 4]
Japanese Laid-open Patent Application No. 07-301733

As controls get more complex and more advanced in industrial field in recent years, there is a growing demand for controlling a number of objects to be detected by a single control device. In the case where a number of objects to be detected are arranged densely, optical fiber photoelectric sensor units are often adopted because of their small sensor head and usability. Above all, an optical fiber photoelectric sensor unit which can be linked with a large number of other units contiguously and closely via a DIN rail is preferable because a large number of sensor units can be installed in a small space.

However, the conventional optical fiber photoelectric sensor units disclosed in Patent Documents 1 to 3 can handle one channel's worth of detecting operation. Therefore, when there are plural objects to be detected such as 8 channels (8 sites), 16 channels (16 sites) or 32 channels (32 sites), it is necessary to arrange as many optical fiber photoelectric sensor units as the channels. Concerning the width and thickness of the sensor unit in the direction to be linked with other units, as the result of manufacturers' efforts to reduce the dimensions, the width has been reduced to 10 mm or so. However, since there are limits to their efforts to reduce the dimensions, as the number of channels increases, the length of a string of sensor units linked on the DIN rail becomes non-negligible. In particular, when the sensor units are forced to be installed inside a control device such as a machine tool, there are more constraints in space than the case where sensor units are installed inside a general control panel.

Since sensor units are independent from channel to channel as products, it becomes costly to use a number of them. It is possible to realize cost reduction by handling a number of detection channels by a single product, although a large case is necessary for the sensor units. However, different users require different numbers of channels, and satisfying every user would require various types of sensor units having different number of channels, which is far from achieving sufficient cost reduction. As another problem, when a multi-channel sensor unit is produced, it is not apparent what structural consideration should be taken in terms of performance such as output response, the function of being linked with other optical fiber photoelectric sensor units, and usability. As further another problem, arranging the optical fiber inlets of plural detection channels in the lateral direction as in the optical fiber photoelectric sensor units disclosed in Patent Document 4 cannot obtain the effects to save space from the multi-channel structure.

SUMMARY OF THE INVENTION

The present invention, which has been contrived by focusing attention on these conventional problems, has an object of providing an optical fiber photoelectric sensor unit which can reduce the substantial width taken upper channel in the case where plural sensor units are linked.

The present invention has another object of providing an optical fiber photoelectric sensor unit which can keep operation and display function in each channel as much as possible, while reducing the substantial width taken up per channel.

The present invention has further another object of providing an optical fiber photoelectric sensor unit which can perform output operation and display operation by making the best use of detection information between adjacent channels, while substantially reducing the width taken up per channel.

The present invention has further another object of providing an optical fiber photoelectric sensor unit which has as high compatibility as can be applied to the conventional one-channel sensor system.

The present invention has further another object of providing an optical fiber photoelectric sensor unit which can realize cost reduction in both of the case where a comparatively small number of detection channels are used and the case where a comparatively large number of detection channels are necessary.

The other objects and effects of the present invention will be easily understood by the person skilled in the art by referring to the following description of the specification.

The optical fiber photoelectric sensor unit of the present invention is on the condition that the sensor unit includes a rail attachment part on the bottom surface, a display art and an operation part on the top surface, fiber inlets on the front surface, and a cord drawing-out or connector type output part on the rear surface, and its size in the longitudinal direction of the rail is not more than 15 mm.

The wording "rail attachment part" is used here with a DIN rail in mind; however, it goes without saying that the "rail" does not mean a specific physical shape, and includes an arbitrarily-shaped rail or attachment tool used to install this type of optical fiber photoelectric sensor unit on a control panel or inside a control device. It also goes without saying that the wording "top surface" on which the "display part and operation part" are fixed indicates the top surface in the case where the sensor unit is placed on a horizontal attachment surface, and does not indicate the surface facing upward when the sensor unit is placed in another direction. It does not matter if there is a transparent cover or the like on the "top surface". The top surface is not necessarily flat and can have an inclination or a moderate curve for the convenience of visibility.

The "front surface" on which the fiber inlets are formed means the front surface in the case where the sensor unit is installed on the horizontal surface, and does not mean the front surface in an arbitrary position. If the case of the sensor unit and the case of the fiber clamper are independent and can be separated from each other, the surface of the clamper into which the fibers are inserted corresponds to the "front surface", and the meaning of the "front surface" should be understood by the comparison with the "rear surface" mentioned later.

It goes without saying that the "rear surface" on which the output part is provided indicates the "rear surface" that is opposite to the "front surface" when the sensor unit is installed on the horizontal surface. The "cord drawing-out type" indicates that the tips of the electric cords corresponding to a power line and a signal line are permanently fixed inside the sensor housing by soldering or screws and are not attachable or detachable by the normal operation. The "connector type" means that as the applicant of the present invention disclosed in Japanese Laid-open Patent Application No. 2001-196127, the power line and the signal line are designed to be attachable to and detachable from the main body case of the sensor unit via a connector. It is also known that adjacent connectors are linked to share the power line.

The size of the sensor unit in the longitudinal direction of a rail is set to 15 mm or less because the currently available products have already achieved this level and for the purpose of making it clear that the present invention can be applied to a slim product with the size which is expected to be the standard in the future, too. If this size of the optical fiber photoelectric sensor unit is too small, the display device and the operation switch also become too small to be easily handled, which means that there are limits to the size reduction. The preferable size is 5 to 15 mm and more preferably 7 to 12 mm.

On the aforementioned condition, the present invention has two sets of light-emitting and light-receiving circuits corresponding to the first and second detection channels. The light-receiving circuits do not include an A/D converter provided in the latter stage. Therefore, the two sets of light-receiving circuits do not have to have their own A/D converters. The "two sets of light-receiving circuits" can be composed of two sets of light-receiving elements and analog amplifying circuits. In particular, when a microprocessor is used to compose the CPU, the A/D converter containing the microprocessor therein does not have a large number of bits, which places constraints in the precision improvement of instrumentation and display. In this case, although it is a little expensive, an external A/D converter can be used and shifted between the first channel and the second channel by means of a selector so as to secure a sufficient number of data bits without large cost increase, thereby realizing high precision in detection and display.

The present invention includes a single CPU which performs the detecting operations of two detection channels (controlling the timing of light emission and the timing of acquiring the amount of received light and then discriminating the amount of received light by a threshold value) by time sharing. As the means to realize this CPU, hardware such as a programmable gate array can be used instead of a microprocessor. The "time sharing" referred to here is not restricted to "performing a series of processes alternately from light emission and light reception to the determination" and may include various ways of time sharing. This structure can reduce the area taken up by the circuit components and decrease the cost as compared with the case where each detection channel has a CPU of its own.

The present invention further includes two output lines corresponding to the two detection channels. The "two output lines" excludes the case where one output line is used in a time-sharing manner to handle two detection channels. This structure enables each channel to have an output line of its own, which never damages the output response unlike the time sharing structure.

The present invention further includes four fiber inlets aligned vertically on the front surface. The lower two inlets are a pair of light-emitting and light-receiving inlets corresponding to the first channel, and the upper two inlets are a pair of light-emitting and light-receiving inlets corresponding to the second detection channel. With this structure, in the case where a one-channel optical fiber photoelectric sensor unit is manufactured, the light-emitting and light-receiving inlets composing the detection channel can be disposed in the position corresponding to the lower two of the housing to make the one-channel housing structure have the same basic structure as the two-channel housing structure of the present invention, whereby some components can be shared. Some of the light-emitting and light-receiving fibers used in this type of optical fiber photoelectric sensor unit are tightly integrated with each other in a parallel condition, so the arrangement of the fiber inlets corresponding to the same channel vertically adjacent to each other can facilitate the engagement of the tightly integrated light-emitting and light-receiving fibers, which are branched only at the tip portion to be inserted into the main body of the sensor unit, with the sensor unit.

The present invention further includes a first and second digital display parts on the top surface. On each of these digital display parts, numerals are arranged in the longitudinal direction of the case. The first and second digital display parts themselves are arranged in the longitudinal direction of the case at regular intervals. The longitudinal direction of the case is orthogonal to the directions of the respective numerals to be arranged, whereby the digits can be arranged in the longitudinal direction of the case within a minimum space. This can increase the number of digits to be displayed.

In the present invention, the first digital display part displays the amount of received light of the first detection channel, and the second digital display part displays the amount of received light of the second detection channel.

In other words, it is not that the first detection channel and the second detection channel are selectively displayed by switching a single digital display part, but the amounts of received light of both channels can be checked at the same time. Consequently, although two channels' worth of detection function and display function are accommodated in a single housing, these functions are the same as the conventional two one-channel sensor units, whereby the space factor in the condition that plural sensor units are linked with each other can be increased without deteriorating the functionality.

According to the aforementioned optical fiber photoelectric sensor unit of the present invention, one photoelectric sensor unit provided with two sensor units' worth of functions (two channels) can be placed in the width of nearly one sensor unit, and the operation conditions of both channels can be checked at the same time. In addition, a single sensor product having two detection channels enables the channels to share the case and the CPU, thereby realizing cost reduction. Furthermore, users requiring any number of channels can meet their demands by combining the sensor unit of the present invention having two detection channels with a conventional sensor unit having a single detection channel, which can prevent a cost increase resulting from the preparation of sensor units having various channel numbers. When a number of detection channels are used, even if one channel is left without being used, a waste of the cost is relatively small in ratio, so the sensor unit of the present invention can be used exclusively.

In the preferred embodiments of the present invention, the first operation indicator light is disposed adjacent to the first digital display part, and the second operation indicator light is disposed adjacent to the second digital display part. As a result, one of the first and second operation indicator lights is sandwiched between the first and second digital display parts.

In this structure, the operation indicator lights are disposed adjacent to the respective channels, which makes it easy to understand the relationship between the operation condition and the amount of received light in each detection channel, thereby increasing usability.

In the preferred embodiments of the present invention, selecting operation can shift the display contents of the first and second digital display parts among the following three: the amount of received light of the first detection channel and the amount of received light of the second detection channel; the amount of received light and the threshold value of the first detection channel; and the amount of received light and the threshold value of the second detection channel.

According to this structure, the previously provided two digital display parts can properly select either the individual amounts of received light or the amount of received light and the threshold value of each channel, and display them. This enables a single sensor to handle two channels' worth of functions without damaging the display function about the individual channels.

A preferred embodiment of the present invention includes a logical calculation means for performing logical calculations between the detection results of the first detection channel and the detection results of the second detection channel; and output lines for outputting the logical calculation results of the logical calculation means. The "logical calculation means" can be the logical circuit composed of wired logic or software to be executed by a microprocessor. Concerning the "output lines for outputting the logical calculation results", one of the aforementioned two lines can be shared or a special output line can be added.

In this structure, not only it becomes possible to output the logical calculation results of adjacent two channels, but also communication becomes unnecessary between sensor units unlike the conventional case where logical calculations are performed between adjacent sensor units, thereby realizing logical calculation outputs with high response. Furthermore, since the communication between adjacent sensor units is unnecessary, the time for it can be allotted to more complicated logical calculations.

A preferred embodiment of the present invention includes a difference calculation means for calculating the difference between the amount of received light of the first detection channel and the amount of received light of the second detection channel; a discrimination means for discriminating the results of the difference calculation of the difference calculation means by a threshold value; and output lines for outputting the discrimination results of the discrimination means. The "difference calculation means" can be either the case where an analog difference calculation circuit is used or the case where a microprocessor is used to execute in a software manner. Concerning the "output lines for outputting the discrimination results", one of the two lines can be shared as mentioned earlier or a special output line can be added.

A preferred embodiment of the present invention includes a fiber locking mechanism for concurrently locking the four fibers which are inserted into the vertically arranged four fiber inlets by operating a single clamp operator. Conventionally, when a pair of light-emitting and light-receiving fibers is locked, these two optical fibers are clamped integrally by a single movable block. When there are two pairs of light-emitting and light-receiving fibers as in the present invention, there may be cases where only one of the two pairs of fibers must be attached or detached. However, separately locking or unlocking the vertically arranged two pairs of optical fibers for different channels requires two clamp operators (also referred to as clamp levers, lock buttons or the like). For example, when the clamp operators are clamp levers, disposing the two clamp levers in a small space of the sensor housing and operating them independently requires disposing the rotation axes of the levers one behind the other or reducing the width of the levers so as to arrange the levers in parallel in the width direction of the sensor housing, and in either case, an extremely complex structure must be employed. In the case where the main purpose is to reduce the area taken up by linked sensor units, even by sacrificing the separate attachment or detachment of the two system fibers, priority should be given to facilitating the accommodation of the sensor units to the case by simplifying the structure. From this viewpoint, the fiber locking mechanism for concurrently locking the four fibers by the operation of a single clamp operator is said to be most suitable for space saving. The fiber locking mechanism can include a base block having four fiber inlets which are vertically arranged at appropriate intervals (not necessarily regular intervals) for receiving the tips of the fibers; four flexible C-rings which are fixed to the base block in correspondence to the openings of the four fiber inlets of the base block; a common sliding actuator which is supported on the front surface side of the base block in a vertically slidable manner and which is engaged with the four C-rings to enlarge or reduce their diameter; and a clamp lever which is supported by the base block in a rotatable manner and which makes the sliding actuator slide by the rotation.

A preferred embodiment of the present invention further includes a switch means which alternately switches between the first detection channel and the second detection channel to perform detecting operation, every time the detecting operation timing that has been generated based on an external synchronization signal arrives.

Generally, in this type of sensor system, one parent sensor unit is linked with plural child sensor units (the parent sensor unit and the child sensor units can have the same structure and their roles can be determined by self setting or external setting). The parent sensor unit transmits a synchronization signal to the adjacent child sensor unit periodically by a timer, and the child sensor unit forwards the synchronization signal to the next child sensor unit by the bucket brigade system. Each child sensor unit performs detecting operation upon receiving the synchronization signal from the preceding sensor unit and forwards the synchronization signal to the next sensor unit with a minor delay time. Thus, the parent sensor unit controls the synchronization of the whole system, while the child sensor units perform light emission and reception with a minor time difference, thereby preventing interference between adjacent sensor units. On the other hand, in each of the parent sensor unit and the child sensor units, processing the data of light reception following the light emission and light reception needs some time, and before finishing a tour of operation of the whole sensor units composing the sensor system, the operation to process the reception in the final sensor unit must be complete. However, in the case where a conventional one-channel sensor unit and the two-channel sensor unit of the present invention are used together, or in the case where all the sensor units composing the sensor system are the two-channel sensor unit of the present invention, when detecting operations are performed in succession with a minor delay time between adjacent channels in the same sensor unit, and particularly when two receiving circuits are mounted on the same circuit board, it is expected that the detecting operations are disturbed by the presence of noises between the channels or the influence of the voltage fluctuation of the power line.

Furthermore, successively performing two channels' worth of detecting operations in a single sensor unit inevitably increases the length of time to complete the operations by the single sensor unit. Therefore, although the design values indicate that the operation in the final channel is complete within the previously determined one cycle even if the assumed maximum number of channels such as 8, 16, or 32 are mounted, the presence of a two-channel sensor unit in the system causes the operation to exceed one cycle (so-called cycle time over), whereby the operations of the whole sensor system might be hindered.

On the other hand, in the present embodiment of the present invention, although the sensor housing has two channels, the adjacent two channels in the same sensor unit are not operated in succession, that is, every time the operation of the sensor system makes a tour, adjacent sensor units are made to perform detecting operation alternately. In this structure, even when a single sensor unit has the two-channel function, the time required for the detecting operation becomes the same as in the one-channel sensor unit. This enables the sensor system with the conventional synchronization control to perform proper detecting operations without a hitch.

This embodiment is effective not only in the sensor system where a single parent sensor unit has plural child sensor units and a synchronization signal is transmitted from one sensor unit to another, but also in the sensor system where a common synchronization line is connected to all sensor units arranged in parallel to compose the system and each sensor unit has a unique delay time for synchronization as a whole. Thus, even in the sensor system utilizing a common synchronization line, the maximum cycle time is determined according to the assumed maximum number of sensor units to be linked such as 8, 16, or 32. Therefore, if the time taken up by one specific sensor unit is increased by providing the sensor unit with two channels, the same inconvenience will occur in the system as a whole.

Therefore, as in the present embodiment, by providing the switch means for alternately switching between the first detection channel and the second detection channel to perform detecting operation, every time the detecting operation timing which is generated based on an external synchronization signal arrives, it becomes possible that a sensor system having a prescribed cycle time has the advantage of not adversely affecting the system as a whole even if a two-channel sensor unit is introduced for one or all of the sensor units composing the system.

The optical fiber photoelectric sensor unit of the present invention prescribed from another viewpoint includes as a precondition a rail attachment part on the bottom surface, a display part and an operation part on the top surface, fiber inlets on the front surface, and a cord drawing-out or connector type output part on the rear surface, and comprises: two sets of light-emitting and light-receiving circuits corresponding to a first and second detection channels; a single CPU which performs detecting operations of two detection channels by time sharing; two output lines corresponding to the two detection channels; four fiber inlets aligned vertically on the front surface; and a display device which is disposed on the top surface of the case and which displays a string of digits in the longitudinal direction of the case and also displays the amount of received light of the first detection channel and the amount of received light of the second detection channel in digital numbers. As explained earlier, this optical fiber photoelectric sensor unit can be manufactured at a lower cost than two one-channel sensor units. The amount of received light of each channel can be checked by digital number, which makes the sensor unit easy to use.

According to a preferred embodiment of this optical fiber photoelectric sensor unit, the display device includes a first and second digital display parts which each display the string of digits in the longitudinal direction of the case and which are arranged in the longitudinal direction of the case, wherein the first digital display part displays the amount of received light of the first detection channel and the second digital display part displays the amount of received light of the second detection channel. This enables the amounts of received light of both channels to be checked at the same time. As another embodiment of the display device, the amounts of received light of all channels can be displayed alternately on a single digital display part.

This optical fiber photoelectric sensor unit can employ various arrangements of the four fiber inlets. For example, the two fiber inlets of one channel can be arranged vertically and the fiber inlets of the different channels can be arranged laterally; the two fiber inlets of one channel can be arranged laterally and the fiber inlets of the different channels can be arranged vertically; or these positional relations can be set diagonally. According to another preferred embodiment of this optical fiber photoelectric sensor unit, the size of the sensor unit in the longitudinal direction of the rail is not more than 15 mm, and the four fiber inlets are arranged vertically on the front surface. This arrangement enables the four fiber inlets to be accommodated without any trouble on the front surface with a short width, thereby realizing the arrangement of a photoelectric sensor unit having two sensor units' worth of function (two channels) in the width of nearly one sensor unit.

The four fiber inlets can be arranged in a manner that the lower two are a pair of light-emitting and light-receiving fiber inlets corresponding to the first detection channel and the upper two are a pair of light-emitting and light-receiving fiber inlets corresponding to the second detection channel.

BRIEF DESCRIPTION OF THE DRAWINGS

FIG. 16 is a view of display forms of the first and second digital display parts.

FIG. 18 is a table describing each process in the general flowchart of FIG. 11.

FIG. 19 is a table describing each process in the SET mode process of FIG. 12.

FIG. 20 is a table showing the relationship between the function number F and the function types and the capability or incapability of the individual setting for each channel.

FIG. 21 is a table describing each process in the RUN mode process of FIG. 13.

FIG. 22 is a table describing each process in the instrumentation interrupt process of FIG. 14.

DESCRIPTION OF THE PREFERRED EMBODIMENTS

A preferred embodiment of the optical fiber photoelectric sensor unit of the present invention will be described in detail as follows, with reference to the attached drawings. The following embodiment is nothing but an example of the present invention, and the gist of the present invention is prescribed only by the scope of the claims.

Figure 1:
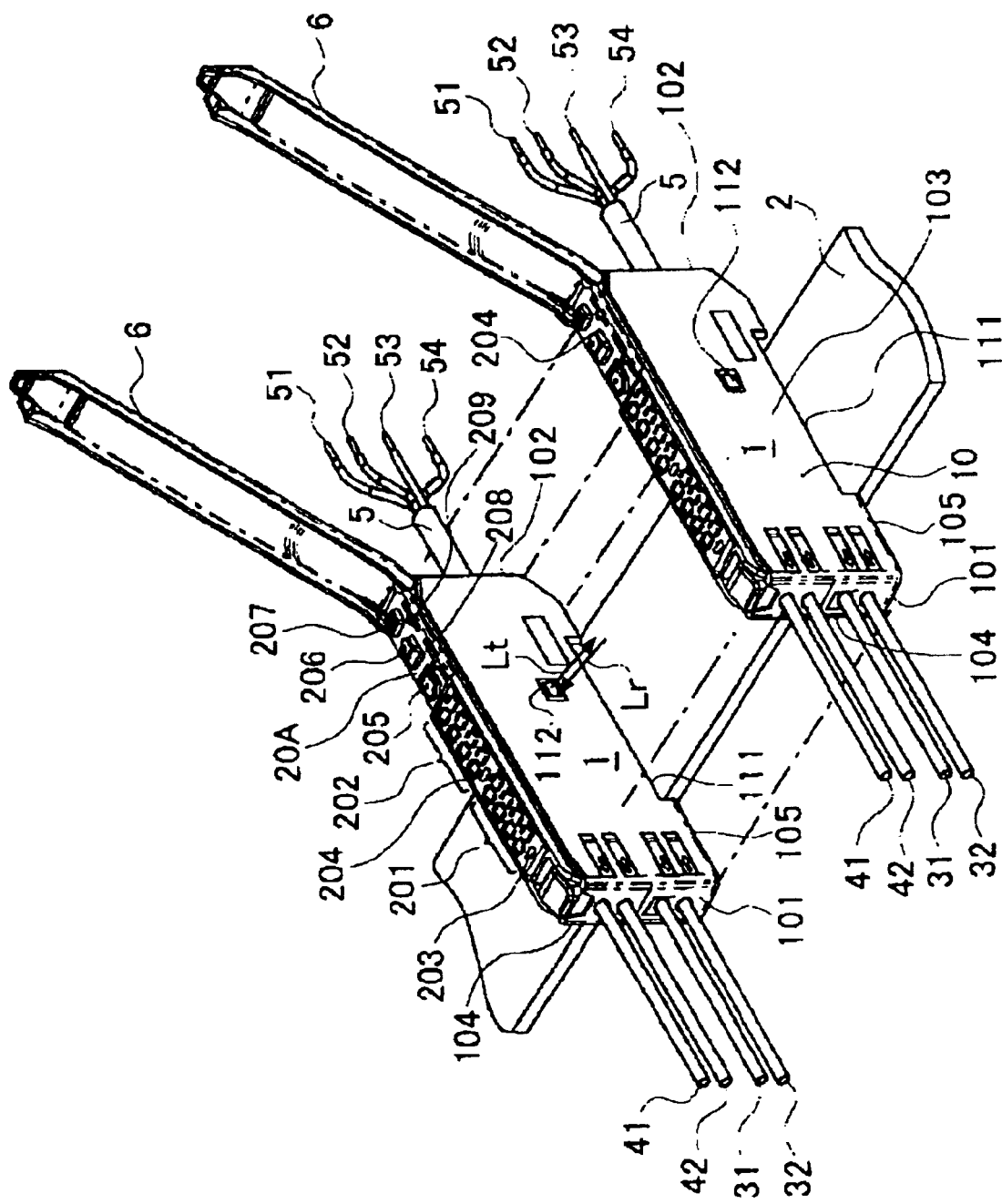
FIG. 1 is a perspective view of the photoelectric sensor unit in the state of being linked with another.
Figure 2:
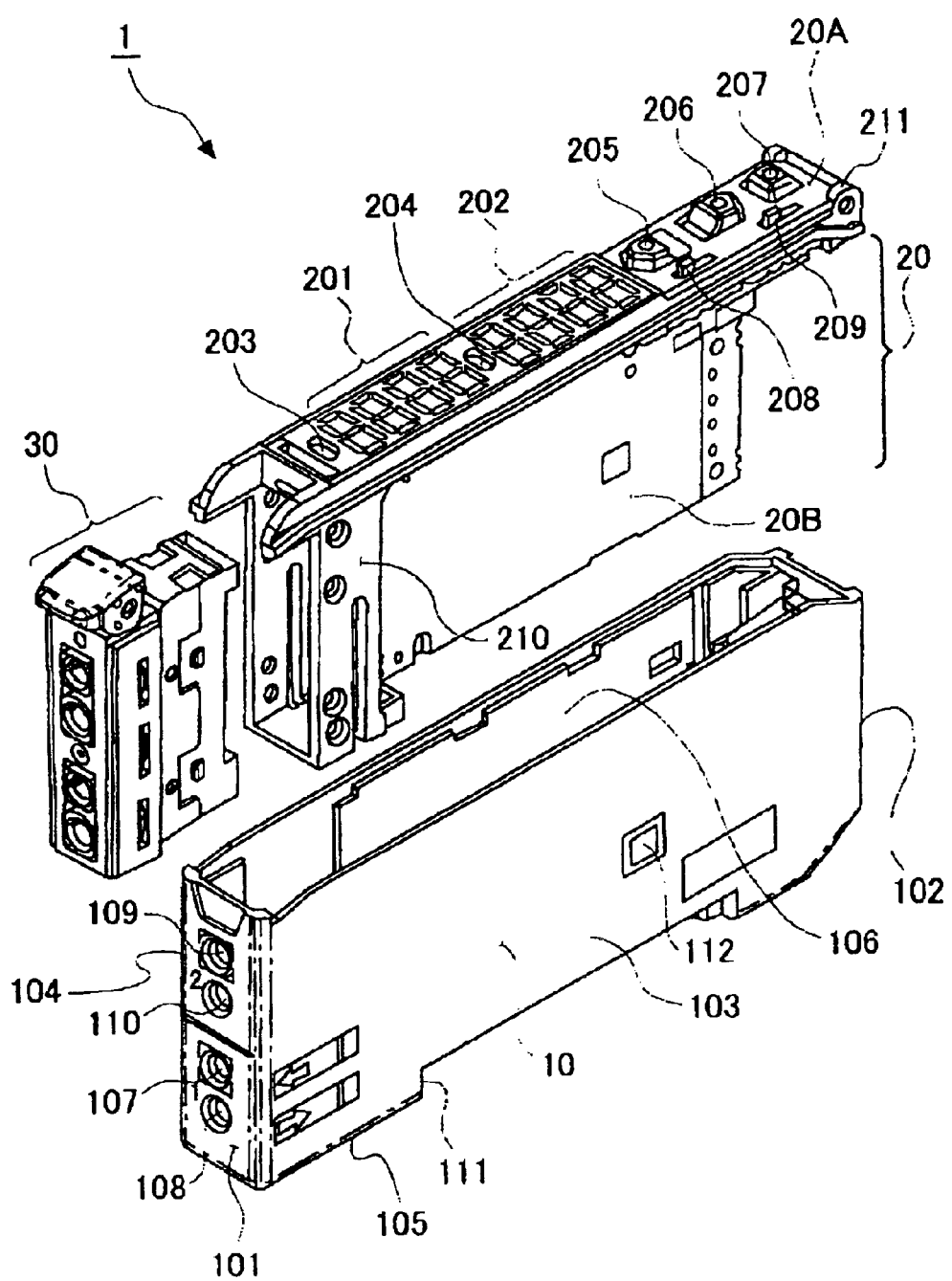
FIG. 2 is an exploded perspective view showing the internal structure of the photoelectric sensor unit.

A perspective view of the photoelectric sensor unit in an embodiment of the present invention in the state of being linked with another is shown in FIG. 1, and an exploded perspective view showing the internal structure of the photoelectric sensor unit is shown in FIG. 2.

As shown in these drawings, the photoelectric sensor unit 1 of the present embodiment includes a case main body 10 having an open top surface; a main body assembly 20 which is inserted into the case main body 10 and closes an opening 106 of the case main body 10; and a clamber assembly (corresponds to the locking mechanism of the present invention) 30 which is accommodated in a clamper holder part 210 provided in the front part of the main body assembly 20. The case main body 10 is an integrally formed synthetic resin product and has a hexahedral structure consisting of a front surface plate 101, a rear surface plate 102, a right-hand surface plate 103, a left-hand surface plate 104, and a bottom surface plate 105. The front surface plate 101 includes a first-channel light-emitting fiber inlet 107; a first-channel light-receiving fiber inlet 108; a second-channel light-emitting fiber inlet 109; and a second-channel light-receiving fiber inlet 110. In other words, the front surface plate 101 includes four fiber inlets arranged vertically, and the lower two fiber inlets 107 and 108 are for a pair of light-emitting and light-receiving optical fibers corresponding to the first detection channel and the upper two fiber inlets 109 and 110 are for a pair of light-emitting and light-receiving optical fibers corresponding to the second detection channel.

The rear surface plate 102 of the case main body 10 has an electric cord 5 drawn therefrom as shown in FIG. 1. The electric cord 5 is a fixed-cord type and includes a first-channel outputting core wire 51; a second-channel outputting core wire 52; a Vcc core wire 53; and a GND core wire 54. As mentioned earlier, when an electric cord of connector connection type is drawn out, as shown in Japanese Laid-open Patent Application No. 2001-196127, in the exchange of electric power between adjacent connectors, the Vcc core wire 53 is not included except for the electric cord outputted from the end sensor unit of the contiguously linked sensor units.

The right-hand surface plate 103 and the left-hand surface plate 104 of the case main body 10 each include a window 112 for light emission and light reception which performs an optical communication with the adjacent sensor units. When plural sensor units are linked via a DIN rail 2, the window 112 for light emission and light reception faces with the windows 112 of adjacent sensor units. In the drawing, "Lt"

represents infrared light for transmission and "Lr" represents infrared light for reception.

The bottom surface plate 105 of the case main body 10 includes a DIN rail engagement groove 111 which is engaged with the DIN rail 2. Although it is not illustrated, the DIN rail engagement groove 111 includes an engaging mechanism to ease the attachment/detachment of the DIN rail engagement groove 111 to/from the DIN rail 2.

The top surface of the case main body 10 is the opening 106 into which the main body assembly 20 is inserted so as to close the opening 106 by the top-surface panel 20A of the main body assembly 20.

As shown in FIG. 2, the main body assembly 20 is formed by integrally combining a component mounting board 20B which is accommodated in the case main body 10 and the top-surface panel 20A which closes the top opening 106 of the case main body 10. The top-surface panel 20A is provided with the "display part" which takes up nearly ⅔ of the left-hand region and the "operation part" which takes up nearly ⅓ of the right-hand region in FIG. 2.

The display part includes a first digital display part 201; a second digital display part 202; a first operation indicator light 203; and a second operation indicator light 204. In other words, the first operation indicator light 203 is disposed next to the first digital display part 201 on the left, and the second operation indicator light 204 is disposed next to the second digital display part 202 on the left. As a result, the second operation indicator light 204 is disposed between the first digital display part 201 and the second digital display part 202. The first digital display part 201 and the second digital display part 202 are each composed of a 4-digit and 7-segment LED indicator, and these digits are arranged in the longitudinal direction of the main body case 10. In other words, the digits are aligned in the direction orthogonal to the longitudinal direction of the case main body 10. This structure enables the 4-digit digital indicator and the two operation indicator lights to be efficiently arranged within a limited area on the top-surface panel 20A. In the present embodiment, as will be described later, the first digital display part 201 can display the amount of received light of the first channel and the second digital display part 202 can display the amount of received light of the second channel. Alternatively, the first digital display part 201 can display the amount of received light of the second channel and the second digital display part 202 can display the amount of received light of the first channel. In this case, the reference numeral 201 can be referred to as the second digital display part and the reference numeral 202 can be referred to as the first digital display part.

On the other hand, the operation part taking up about ⅓ of the right-hand region of the top-surface panel 20A includes a push button 205 which functions as the operation part of an UP switch; a push button 206 which functions as the operation part of a DOWN switch; a push button 207 which functions as the operation part of a MODE switch; a sliding operator 208 which functions as the operation part of a SET/RUN selection switch; and a sliding operator 209 which functions as the operation part of a channel selection switch. Hereinafter, the pushbutton 205 is referred to as an UP button, the push button 206 a DOWN button, and the push button 207 a MODE button.

The main body assembly 20 includes a clamper holder part 210 in the front part thereof in which a clamper assembly 30 is fixedly accommodated.

Figure 3:
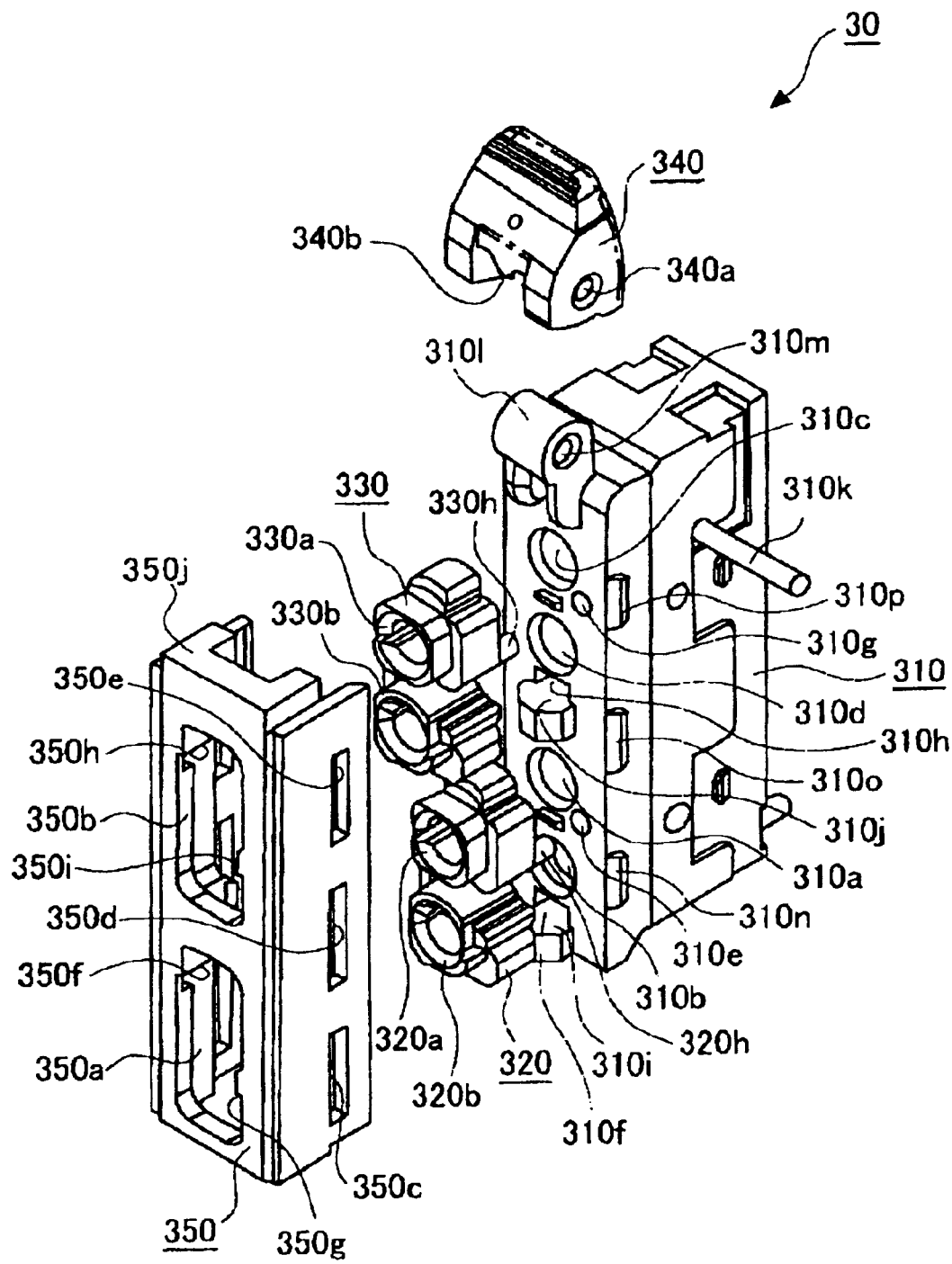
FIG. 3 is an exploded perspective view showing the internal structure of the clamp assembly.
Figure 4:
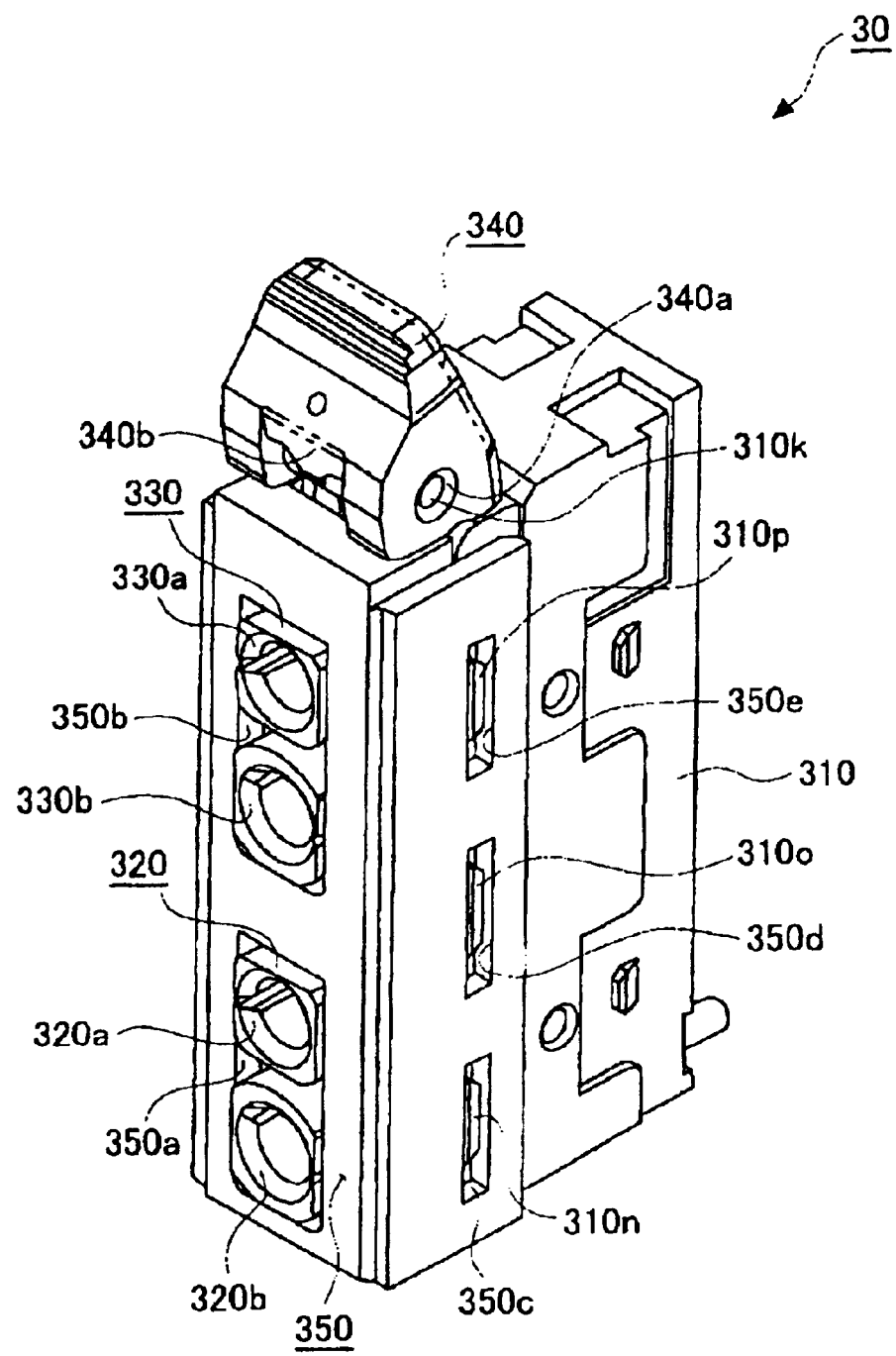
FIG. 4 is a perspective view of the clamp assembly in the state of not being clamped.
Figure 5:
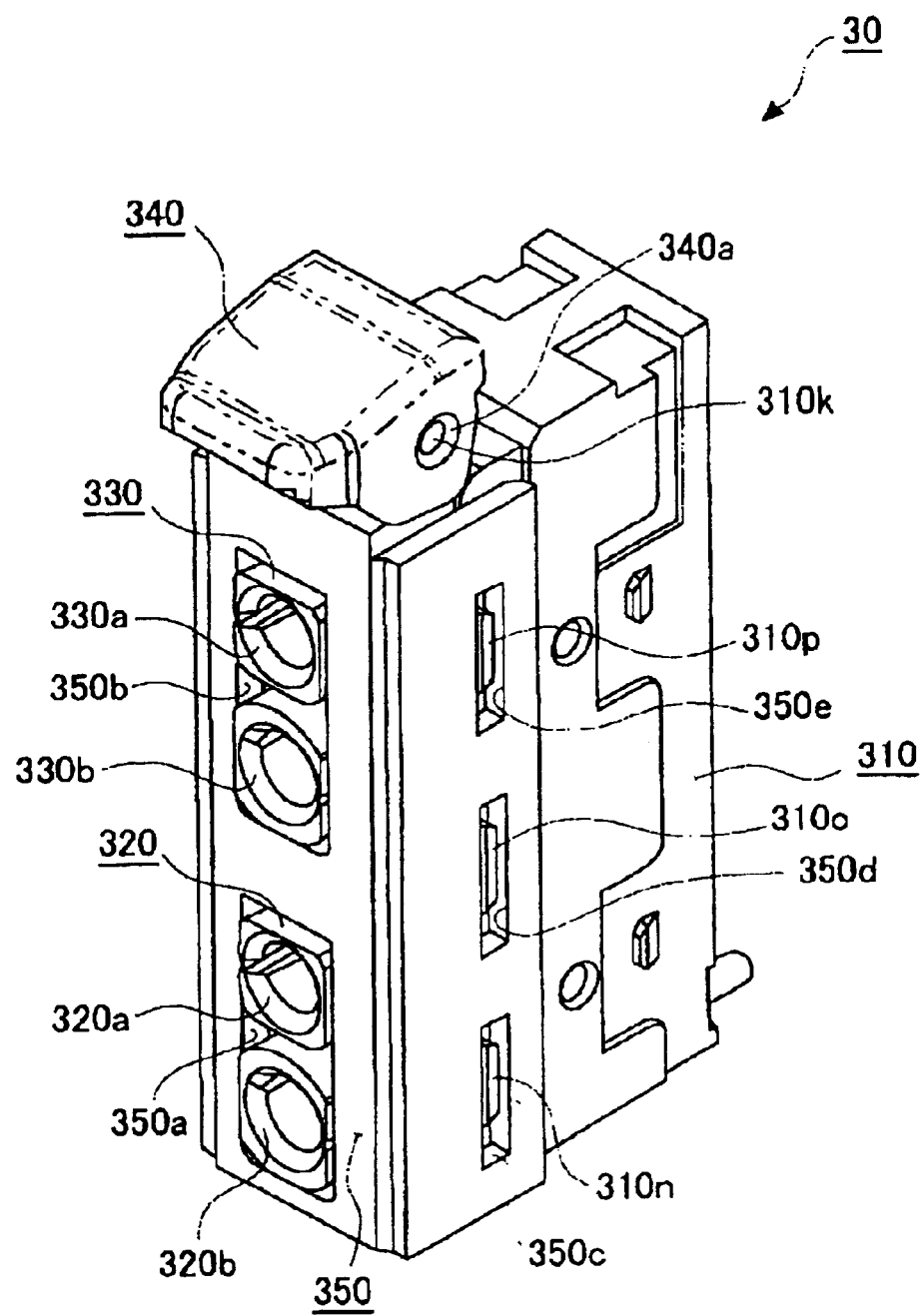
FIG. 5 is a perspective view of the clamp assembly in the state of being clamped.
Figure 6:
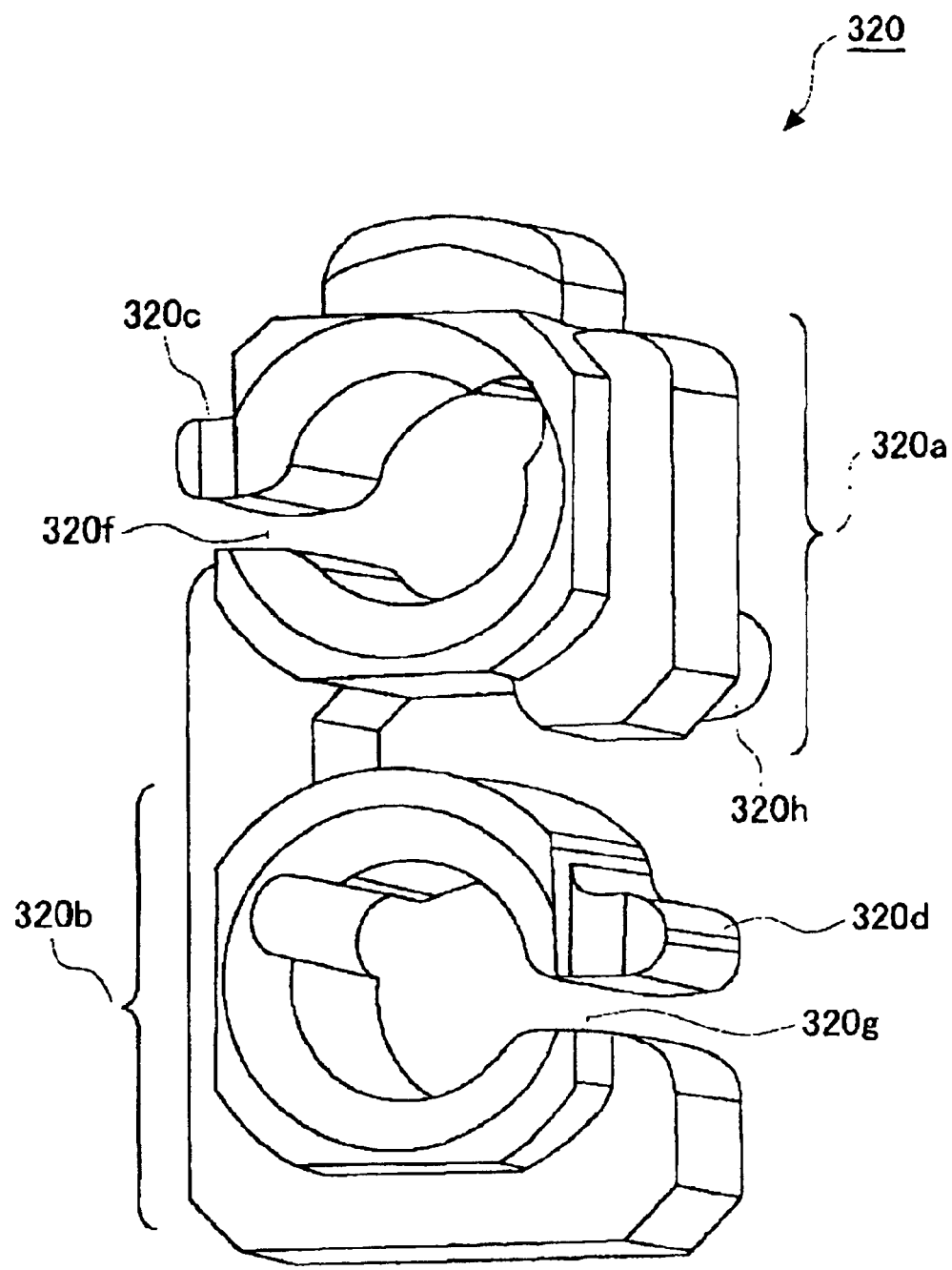
FIG. 6 is a perspective view of the fiber gripper seen from diagonally forward.
Figure 7:
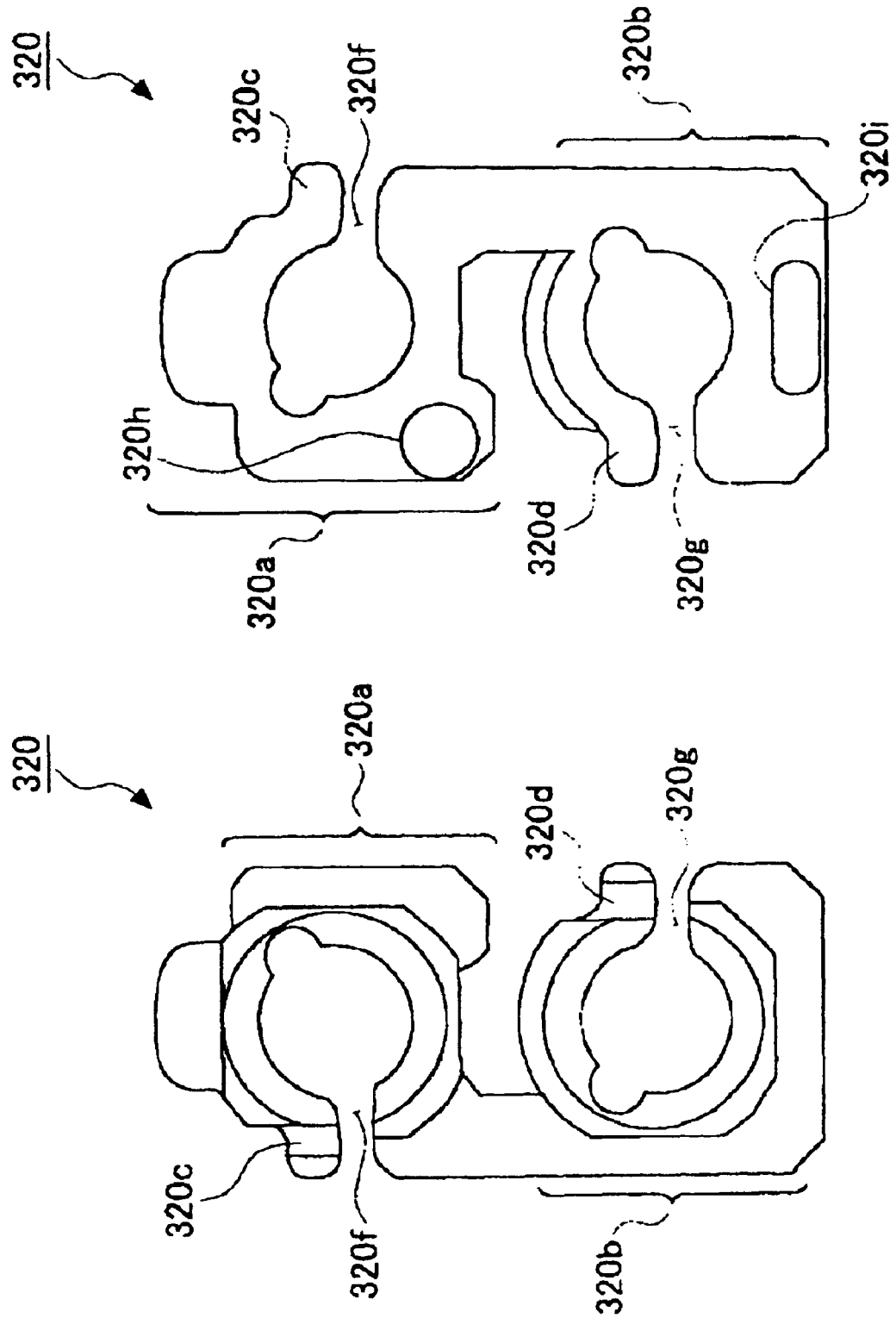
FIG. 7 is a front and rear views of the fiber gripper.
Figure 8:
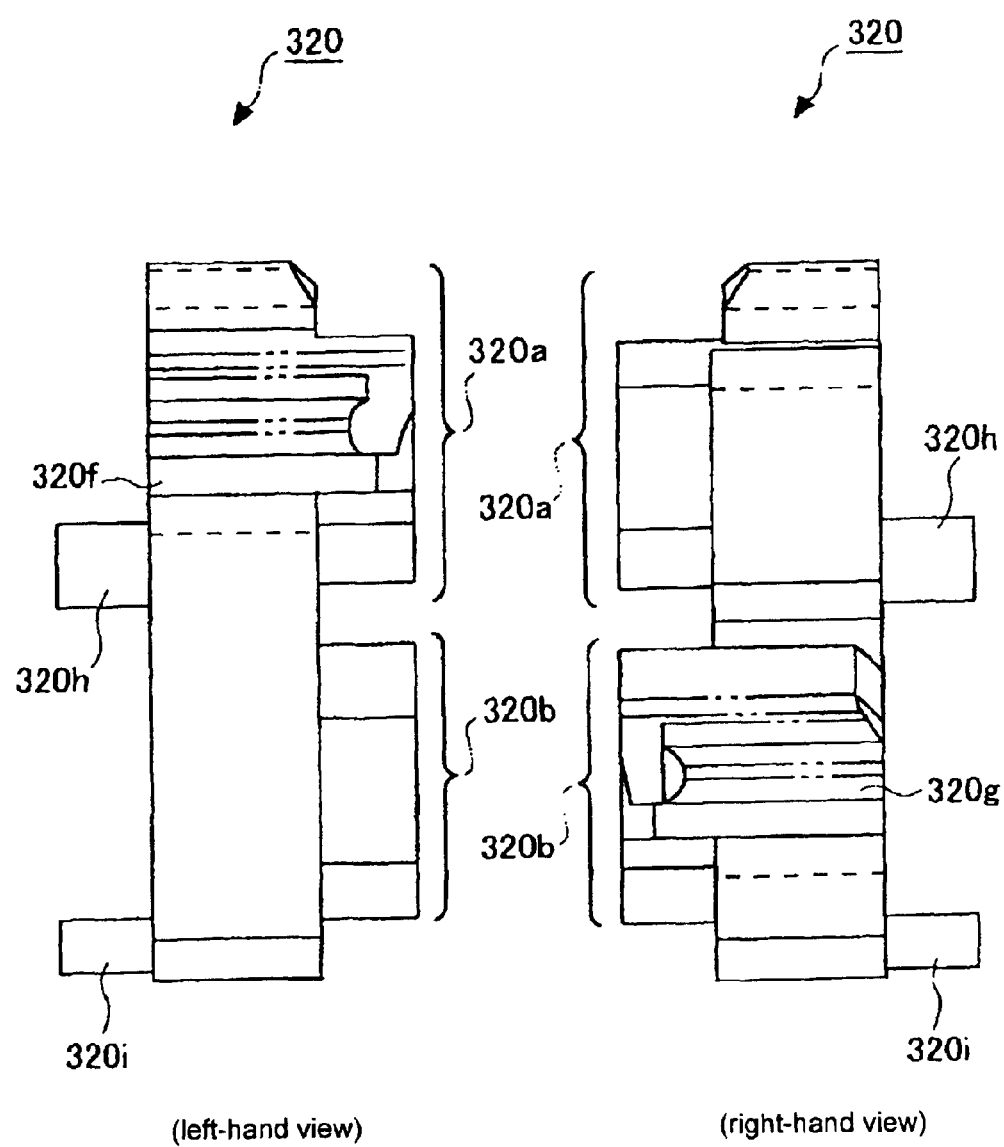
FIG. 8 is a left-hand and right-hand views of the fiber gripper.

An exploded perspective view showing the internal structure of the clamper assembly 30 is shown in FIG. 3; an exploded perspective view of the clamper assembly 30 in the state of not being clamped is shown in FIG. 4; an exploded perspective view of the clamper assembly 30 that is in the state of being clamped is shown in FIG. 5; a perspective view of the fiber gripper seen from diagonally forward is shown in FIG. 6; the front and rear views of the fiber gripper are shown in FIG. 7; and the left-hand and right-hand views of the fiber gripper are shown in FIG. 8.

As shown in FIG. 3, the clamper assembly 30 includes abase block 310, a lower-side fiber gripper 320, an upper-side fiber gripper 330, a clamping lever 340, and a sliding actuator 350.

The front surface of the base block 310 includes four fiber insertion holes 310a, 310b, 310c, and 310d. The insertion hole 310a gets the tip of a first-channel light-emitting optical fiber 31 to be inserted therein, and the insertion hole 310b gets the tip of a first-channel light-receiving optical fiber 32 to be inserted therein. Similarly, the insertion hole 310c gets the tip of a second-channel light-emitting optical fiber 41 to be inserted therein, and the insertion hole 310d gets the tip of a second-channel light-receiving optical fiber 42 to be inserted therein. The front surface of the base block 310 includes, in addition to these insertion holes, positioning holes 310e and 310f for the lower-side fiber gripper 320 and a stage 310i for placing the fiber gripper 320. Similarly, the front side of the base block 310 includes positioning holes 310g and 310h for the upper-side fiber gripper 330 and a stage 310j for placing the fiber gripper 330. In addition, the right and left edge parts of the front surface of the base block 310 include guide projections 310n, 310o, and 310p which are engaged with the sliding actuator 350. At the top of the base block 310 is provided a bracket 3101, which has an axial hole 310m. A clamper lever 340 is fixed in a rotatable manner to the axial hole 310m via a pin 310k.

As shown in FIGS. 6 to 8, the lower-side fiber gripper 320 has a shape formed by linking a top-side C-ring part 320a and a bottom-side C-ring part 320b which are integrally made from plastic. As shown in FIG. 6, the clearance part 320f of the top-side C-ring part 320a is on the left-hand side, and the clearance part 320g of the bottom-side C-ring part 320b is on the right-hand side. At the free end of the top-side C-ring part 320a is provided an ear part 320c, and at the free end of the bottom-side C-ring part 320b is provided an ear part 320d. These ear parts 320c and 320d can be pushed down to reduce the bores of the top-side C-ring part 320a and the bottom-side C-ring part 320b. In contrast, the downward force against these ear parts 320c and 320d can be released to return these C-ring parts 320a, 320b to the original shapes by their elasticity and to grow the bore sizes. As will be detailed later, the vertical sliding of the sliding actuator 350 applies a downward force against these ear parts 320c and 320d, whereby the top-side C-ring part 320a and the bottom-side C-ring part 320b are bent to reduce the bores, so as to grip the fibers inserted in these ring parts.

As shown in FIGS. 7 and 8, the rear surface of the lower-side fiber gripper 320 includes a round stick-like projection 320h and a flat board-like projection 320i. The projection 320h, as explained earlier, is inserted into the positioning hole 310e of the base block 310, and the projection 320i is inserted into the positioning hole 310f. The bottom surface of the lower-side fiber gripper 320 comes into contact with the stage 310i, whereby the whole body of the lower-side fiber gripper 320 is placed on the stage 310i and also firmly fixed to the base block 310 via the positioning holes 310e and 310f. The upper-side fiber griper 330, which has the same structure as the lower-side fiber gripper 320, is placed on the stage 310j and fixed to the base block 310 via the positioning holes 310g and 310h. As a result, the four C-ring parts 320a, 320b, 330a, and 330b are positioned at the opening parts of the four fiber insertion holes 310a, 310b, 310c, and 310d provided on the base block 310.

The sliding actuator 350 has a U-shaped cross section when seen from above. The front surface of the sliding actuator 350 includes a bottom-side open window 350a and a top-side open window 350b. Each of the left-hand side and the right-hand side of the sliding actuator 350 includes three guide slits 350c, 350d, and 350e. These guide slits 350c, 350d, and 350e can be engaged with the guide projections 310n, 310o, and 310p of the base block 310 to hold the sliding actuator 350 on the base block 310 and to make it vertically slidable by a minor stroke. The left-hand and right-hand walls of the sliding actuator 350 include four projections 350f, 350g, 350h, and 350i. Sliding the sliding actuator 350 downwards makes the projection 350f formed on the left-hand surface inside the sliding actuator 350 come into contact with the ear part 320c of the top-side C-ring part 320a of the lower-side fiber gripper 320. At the same time, the projection 350g formed on the right-hand surface inside the sliding actuator 350 comes into contact with the ear part 320d of the bottom-side C-ring part 320b of the lower-side fiber gripper 320. Consequently, when the sliding actuator 350 is slid further downwards, the ear parts 320c and 320d of the lower-side fiber gripper 320 are pushed downwards, thereby bending the C-ring parts and reducing their bores. As a result, the fibers inserted into these ring parts 320a and 320b are firmly gripped. The same action is applied to the upper-side fiber gripper 330: the projections 350h and 350i of the sliding actuator 350 come into contact with the ear parts corresponding to the top-side C-ring part 330a and bottom-side C-ring part 330b of the upper-side fiber gripper 330, whereby the bores of these ring parts are reduced and the inserted fibers are firmly gripped in the same manner.

The clamping lever 340 is fixed in a rotatable manner to the axial hole 310m of the bracket 3301 of the base block 310 via the pin 310k. In other words, while the axial hole 310m of the bracket 3101 and the axial hole 340a of the clamping lever 340 are being matched, the pin 310k is inserted through these axial holes so as to fix the clamping lever 340 to the bracket 3101 in a rotatable manner. In this condition, the cam part 340b formed on the bottom surface of the clamping lever 340 comes into contact with the top end surface 350j of the sliding actuator 350. Consequently, as shown in FIG. 4, when the clamping lever 340 is in the state of being raised, the sliding actuator 350 is raised upwards by the stability of the C-ring parts. On the other hand, as shown in FIG. 5, pushing down the clamping lever 340 makes the cam part 340b press down the top end surface of the sliding actuator 350, whereby the sliding actuator 350 is slid downwards. This, as explained earlier, makes the projections 350f to 350i come into contact with and then push down the corresponding ear parts of the upper-side and lower-side fiber grippers 320 and 330. As a result, the corresponding ear parts of the C-ring parts 320a, 320b, 330a, and 330b are pushed down to firmly grip the fibers.

As described hereinbefore, the clamper assembly of the present embodiment includes the base block 310 in which the four fiber insertion holes 310a to 310d for accommodating the tip parts of the fibers are arranged vertically at appropriate intervals; the four flexible C rings 320a, 320b, 330a, and 330b which are fixed on the base block 310 in correspondence with the openings of the four fiber insertion holes 310a to 310d of the base block 310; the single common sliding actuator 350 which is formed on the front surface of the base block 310 and is held in a vertically slidable manner and which is engaged with the four C rings 320a, 320b, 330a, and 330b so as to increase or decrease their bores; and the clamping lever 340 which is supported by the base block 310 in a rotatable manner and which makes the sliding actuator 350 slide by its rotation. This structure enables the single clamping lever 340 to lock the four fibers of the first and second channels collectively. Although the clamping lever 340 and the sliding actuator 350 are shared, the four C-ring parts are integrated into two different sets and separated into the lower-side fiber gripper 320 and the upper-side fiber gripper 330, which are independent from each other without working together. Therefore, this sensor unit can be structured for one channel not for two channels only by removing either one of the fiber grippers, which allows this sensor unit to be manufactured selectively for one channel or two channels by sharing most of the components. Furthermore, having a U-shaped cross section when seen from above, the sliding actuator 350 is structurally strong and can maintain its strength when thinned, which makes the sliding actuator 350 suitable to transmit the force from the clamping lever 340 to the upper-side and lower-side fiber grippers 330 and 320 when accommodated in a narrow case. In either of the upper-side and lower-side fiber grippers 330 and 320, the clearance parts 320f and 320g of the top-side and bottom-side C-ring parts 320a and 320b are disposed on the opposite sides from each other, and the projections 350f and 350g of the sliding actuator 350 which is engaged with the fiber grippers 320 and 330 are separated from each other to the left and to the right. This enables the force applied from above to be distributed evenly to the top-side C-ring part 320a and the bottom-side C-ring part 320b, thereby gripping the fibers in good balance.

Again in FIGS. 1 and 2, a hinge part 211 is provided on the rear part of the top-surface panel 20A, and the hinge part 211 enables a transparent top-surface cover 6 for opening and closing the top-surface panel 20A to be fixed in a rotatable manner. In FIG. 4, a projection 322 is a guide pin used to accommodate the clamper assembly into the clamper holder part 210.

Figure 9:
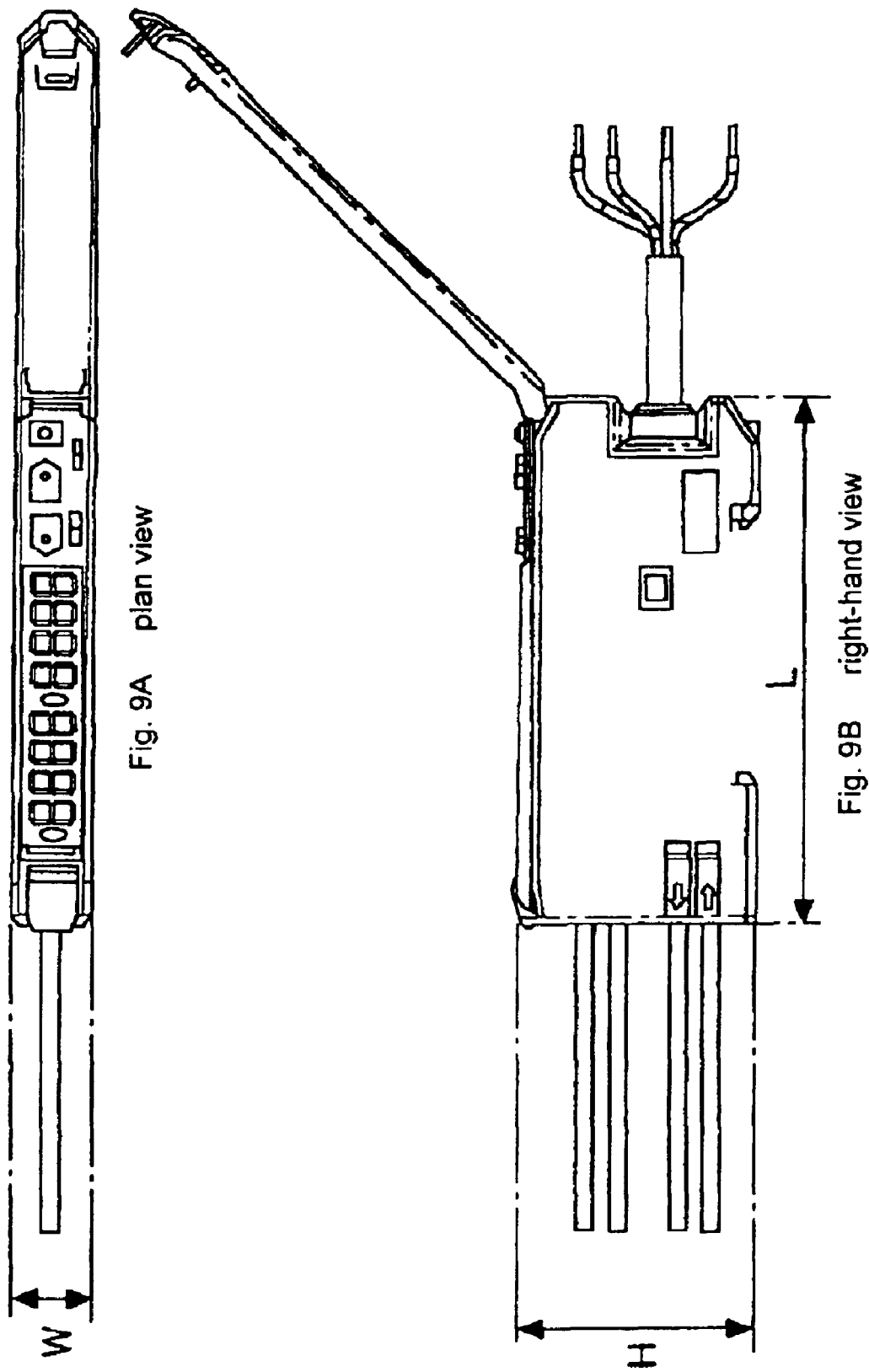
FIG. 9 is a view to explain the outer dimensions of the photoelectric sensor unit.

The outer dimensions of the photoelectric sensor unit explained in FIGS. 1 to 8 are shown in FIG. 9. The photoelectric sensor unit 1 shown in FIGS. 1 to 8 has a width W, a height H and a depth L as in FIG. 9. The width W corresponds to the size in the longitudinal direction of the DIN rail as shown in FIG. 1. The depth L corresponds to the size in the direction orthogonal to the longitudinal direction of the DIN rail. The height H corresponds to the size in the direction vertical to the surface on which the DIN rail 2 is attached. The photoelectric sensor unit 1 of the present embodiment is designed to have the width W of 7 to 12 mm, the height H of 25 to 40 mm, and the depth L of 60 to 80 mm. As one specific example, the width W is 10 mm, the height H is 32 mm, and the depth L is 70 mm. According to the two-channel photoelectric sensor unit with the width W, when 8 sensor units are linked, the total width becomes 80 mm which has 16 channels' worth of capacity; when 16 sensor units are linked, the total width becomes 160 mm which has 32 channels' worth of capacity; and when 32 sensor units are linked, the total width becomes 320 mm which has 64 channels' worth of capacity. Consequently, the same number of sensor units linked can have twice as much channel capacity as the conventional one-channel photoelectric sensor unit. This feature is further preferable for high density mounting.

Figure 10:
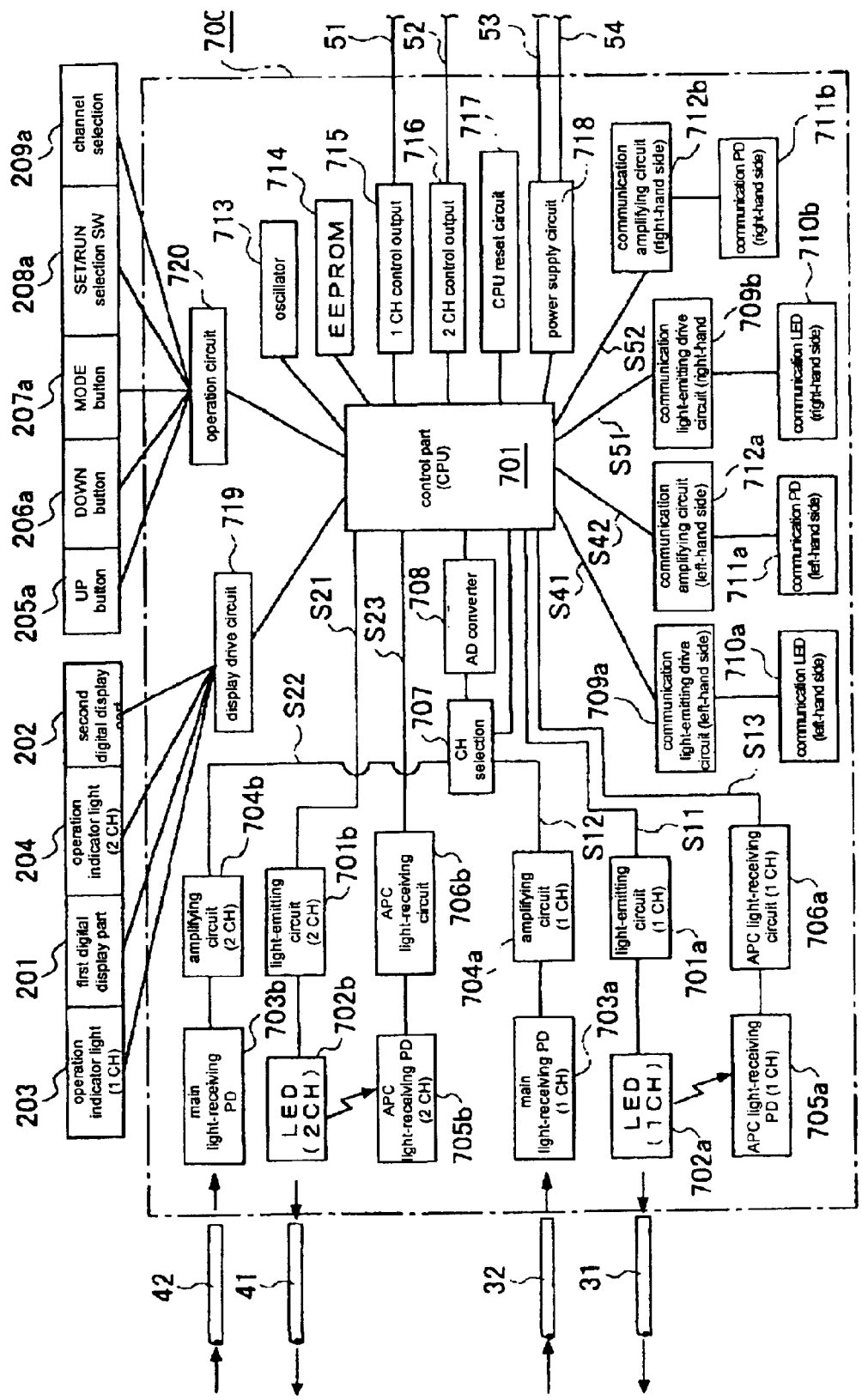
FIG. 10 is a block diagram showing the electric hardware structure of the photoelectric sensor unit.

A block diagram of the electric hardware structure of the photoelectric sensor unit of the same embodiment is shown in FIG. 10. In this drawing, the numeral 700 represents a board mounting circuit included in the component mounting board 20B shown in FIG. 2. The board mounting circuit 700 is mainly composed of a control part (CPU) 701, which is realized by a microprocessor that functions as a one-chip microcomputer in the present embodiment.

The board mounting circuit 700 is divided into a detection system circuit and a communication system circuit. First, the detection system circuit will be described in detail as follows. The detection system circuit is divided into the first channel side and the second channel side. Both sides have nearly the same structure.

The first channel side includes a light-emitting system circuit, a light-receiving system circuit, and an APC system circuit. The light-emitting system circuit includes a light-emitting circuit 701a which is operated by a signal S11 from the control unit (CPU) 701 and an LED 702a which is driven by the light-emitting circuit 701a. The light emitted from the LED 702a composing the light-emitting system circuit is introduced to the optical fiber 31 for light emission and transmitted to an unillustrated fiber head. The light-receiving system circuit includes a main light-receiving PD 703a which receives the light coming from the optical fiber 32 for light reception, and an amplifying circuit 704a which amplifies the output signal of the main light-receiving PD 703a. The APC system circuit includes an APC light-receiving PD 705a which receives the light from the LED 702a composing the light-emitting system circuit, and an APC light-receiving circuit 706a which amplifies the output signal of the APC light-receiving PD. An output signal S13 of the APC light-receiving circuit 706a is taken in by the CPU 701 via an unillustrated A/D converter built therein. Consequently, the CPU 701 executes an auto power control for the LED 702a composing the light-emitting system circuit.

Similarly, the second channel side includes a light-emitting system circuit, a light-receiving system circuit, and an APC system circuit. The light-emitting system circuit includes a light-emitting circuit 701b which is operated by a signal S21 from the control unit (CPU) 701 and an LED 702b which is driven by the light-emitting circuit 701b. The light emitted from the LED 702b is introduced to the optical fiber 41 for light emission and transmitted to an unillustrated fiber head. The light-receiving system circuit includes a main light-receiving PD 703b which receives the light coming from the optical fiber 42 for light reception, and an amplifying circuit 704b which amplifies the output signal of the main light-receiving PD 703b. The APC system circuit includes an APC light-receiving PD 705b which receives the light from the LED 702b composing the light-emitting system circuit, and an APC light-receiving circuit 706b which amplifies the output signal of the APC light-receiving PD 705b. An output signal S23 of the APC light-receiving circuit 706b is taken in by the CPU 701 via the unillustrated A/D converter built therein so as to be used for an auto power control of the LED 702b composing the light-emitting system circuit.

On the other hand, the input side of the channel selection circuit 707 receives an output signal S12 from the first-channel amplifying circuit 704a and an output signal S22 from the second-channel amplifier circuit 704b in parallel. The channel selection circuit 707 performs switching under the control of the CPU 701. On the output side of the channel selection circuit 707 is provided an external A/D converter 708 separate from the CPU 701. The converter 708 has much more output bits than the A/D converter built in the control part (CPU) 701. As one example, the A/D converter built in the CPU has about 10 bits at present, whereas the external A/D converter 708 has 12 bits. Therefore, the CPU 701 can properly control the channel selection circuit 707 to detect the light-receiving output of the first-channel main light-receiving PD 703a or the output of the second-channel main light-receiving PD 703b with high precision via the external A/D converter 708.

Next, the communication system circuit will be described as follows. The communication system circuit is also divided to the left-hand and right-hand sides. As explained earlier with reference to FIGS. 1 and 2, each of the left-hand and right-hand surfaces of the case main body 10 of the photoelectric sensor unit 1 has the window 112 for light emission and light reception via which individual sensor units linked together can perform an optical communication with the adjacent sensor units on the left and right. The photo communication system circuit is divided to the left-hand side and the right-hand side.

The communication system circuit on the left includes a transmission system circuit and a reception system circuit. The transmission system circuit includes a communication light-emitting drive circuit 709a which is operated by a signal S41 from the CPU 701 and a communication LED 710a which is driven by the communication light-emitting drive circuit 709a. The communication LED 710a is so set as to emit infrared light. The receiving system circuit includes a communication PD 711a which receives the infrared light emitted from adjacent sensor units, and a communication amplifying circuit 712a which amplifies the output of the communication PD 711a. An output signal S42 of the communication amplifying circuit 712a is taken in by the CPU 701. Transmission data are included in the signal S41 and reception data are included in the signal S42.

The communication system circuit on the right includes a transmission system circuit and a reception system circuit. The transmission system circuit includes a communication light-emitting drive circuit 709b which is operated by a signal S51 from the CPU 701 and a communication LED 710b which is driven by the communication light-emitting drive circuit 709b. The communication LED 710b is so set as to emit infrared light. The receiving system circuit includes a communication PD 711b which receives the infrared light emitted from the adjacent sensor units, and a communication amplifying circuit 712b which amplifies the output of the communication PD 711b. An output signal S52 of the communication amplifying circuit 712b is taken in by the CPU 701. Transmission data are included in the signal S51 and reception data are included in the signal S52.

The output system circuit includes a first-channel control output circuit 715 and a second-channel control output circuit 716. The first-channel control output circuit 715 generates the detection output of the first channel system, and the detection output thus acquired is transmitted to the first-channel outputting core wire 51 included in the electric cord 5. Similarly, the second-channel control output circuit 716 generates the control output of the second channel system, and the signal from the second-channel control output circuit 716 is transmitted to the second-channel outputting core wire 52 included in the electric cord 5. In this photoelectric sensor unit, the first channel and the second channel have respective control output circuits 715 and 716. Therefore, when a detection output is generated asynchronously in either of the first channel and the second channel, this signal can be immediately transmitted to the core wire 51 or 52 contained in the electric cord 5 any time. Providing a single control output circuit shared by the first channel and the second channel and properly switching this circuit by time sharing would damage the response of the detection output however, according to the present invention, each channel has its own control output circuit 715 or 716, which never deteriorate the response speed.

The power supply circuit 718 stabilizes the electric power obtained from the Vcc core wire 53 and the GND core wire 54, thereby supplying it to every component of the board mounting circuit 700. The CPU reset circuit 717 has the function of resetting the microprocessor which composes the control part (CPU) 701 in response to the prescribed operation of the user.

The following is a description about the structure of the display system. As the display system element, a display drive circuit 719 is provided. As explained earlier with reference to FIGS. 1 and 2, the display drive circuit 719 drives the 7-segment display device composing the first digital display part 201, the 7-segment display device composing the second digital display part 202, the first channel operation indicator light 203, and the second channel operation indicator light 204. The data to be driven are generated by the calculation process of the CPU 701.

The structure of the operation system will be described as follows. The operation system includes an operation circuit 720. As explained earlier with reference to FIGS. 1 and 2, the operation circuit 720 processes signals received from an UP switch 205a corresponding to the UP button 205, a DOWN switch 206a corresponding to the DOWN button 206, a MODE switch 207a corresponding to the MODE button 207, a SET/RUN selection switch 208a corresponding to the SET/RUN sliding operator 208, and a channel selection switch 209a corresponding to the sliding operator 209 for channel selection so as to inform the control part (CPU) 701 with the operations of these switches, thereby initiating the appropriate control programs.

In FIG. 10, the reference numeral 714 represents an EEPROM, which stores various setting data required in the control part (CPU) 701, and the reference numeral 713 represents a crystal oscillator, which generates a clock necessary for the operation of the control part (CPU) 701.

Figure 11:
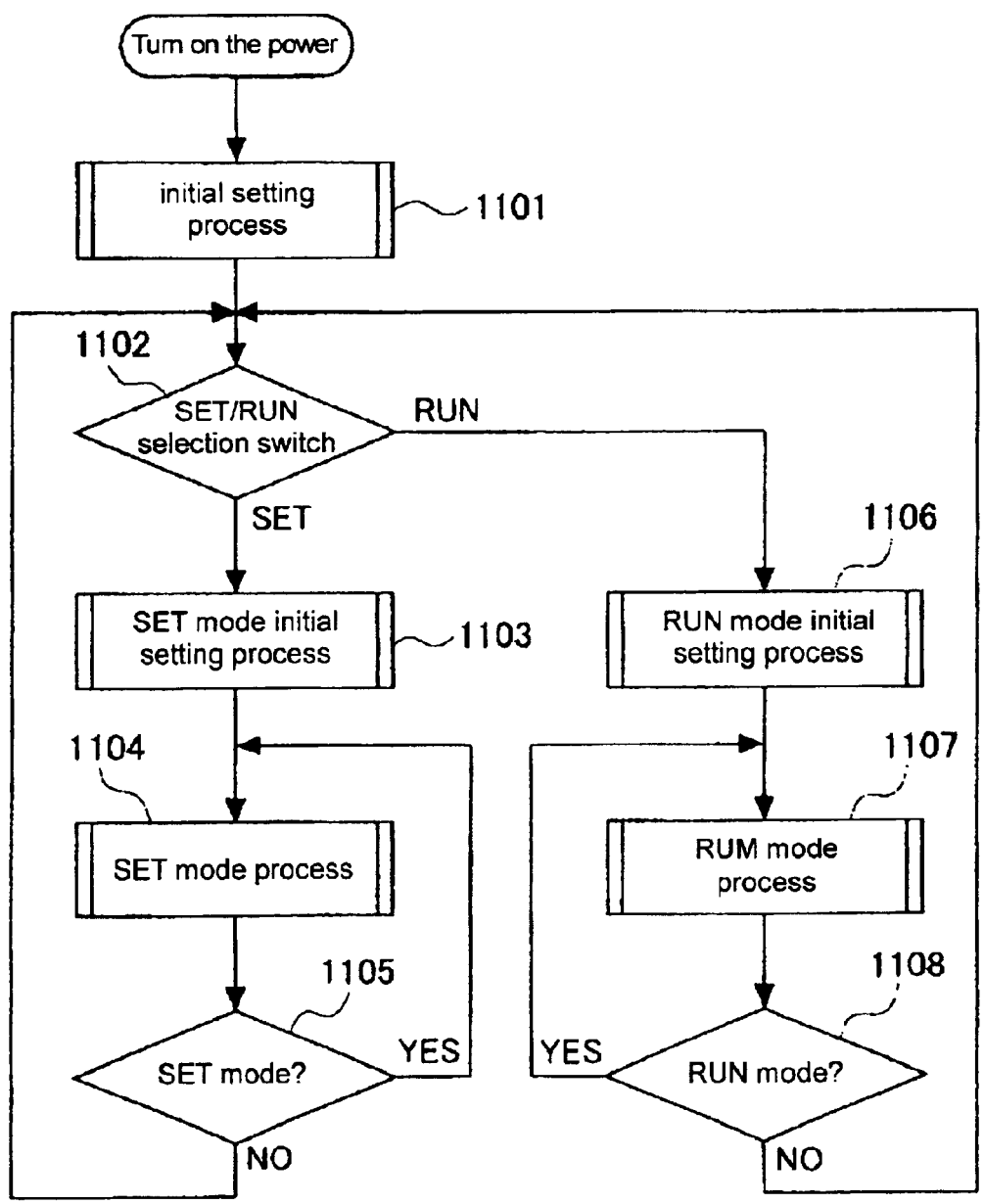
FIG. 11 is a general flowchart depicting the entire software structure of the photoelectric sensor unit.

A general flowchart depicting the entire software structure of the photoelectric sensor unit is shown in FIG. 11, and a table describing each process in the general flowchart of FIG. 11 is shown in FIG. 18. With reference to these drawings, the operations of the photoelectric sensor unit of the embodiments will be described in detail as follows.

In FIG. 11, first of all, an initial setting process (Step 1101) is executed. As shown in FIG. 18, this initial setting process (Step 1101) involves the initialization of various memories, the indicator lights and the control outputs, and the calling up of necessary items from the EEPROM 714 and data checking. Later, the state of the SET/RUN selection switch 208a shown in FIG. 10 is referred to (Step 1102).

As a result of referring to the state of the SET/RUN selection switch 208a, if the switch is set on the SET side (Step 1102: SET), then an SET mode initial setting process (Step 1103) is executed. As shown in FIG. 18, in this SET mode initial setting process (Step 1103), the set value for the SET mode is initialized and the function number F is also initialized (F=0). As will be described in detail later, the relationship between the function number F and the function types, and the capability or incapability of the individual setting for each channel are shown in the table of FIG. 20. In the table, the items are assigned the following function numbers: teaching (F=0), operation mode setting (F=1), detection function setting (F=2), timer function setting (F=3), display contents setting (F=4), key function assignment setting (F=5), power tuning target value setting (F=6), display direction setting (F=7), and output contents setting (F=8). When the SET mode initial setting process is complete (Step 1103), the SET mode process (Step 1104) is executed in accordance with the contents of the SET mode designated in that case. Hereafter, as long as the contents of the SET/RUN selection switch 208a are determined to be "SET" (Step 1105:YES), the SET mode process (Step 1104) is executed continuously, and if the contents of the SET/RUN selection switch 208a are determined to be "RUN" (Step 1105:NO), the flow returns to Step 1102.

Figure 12:
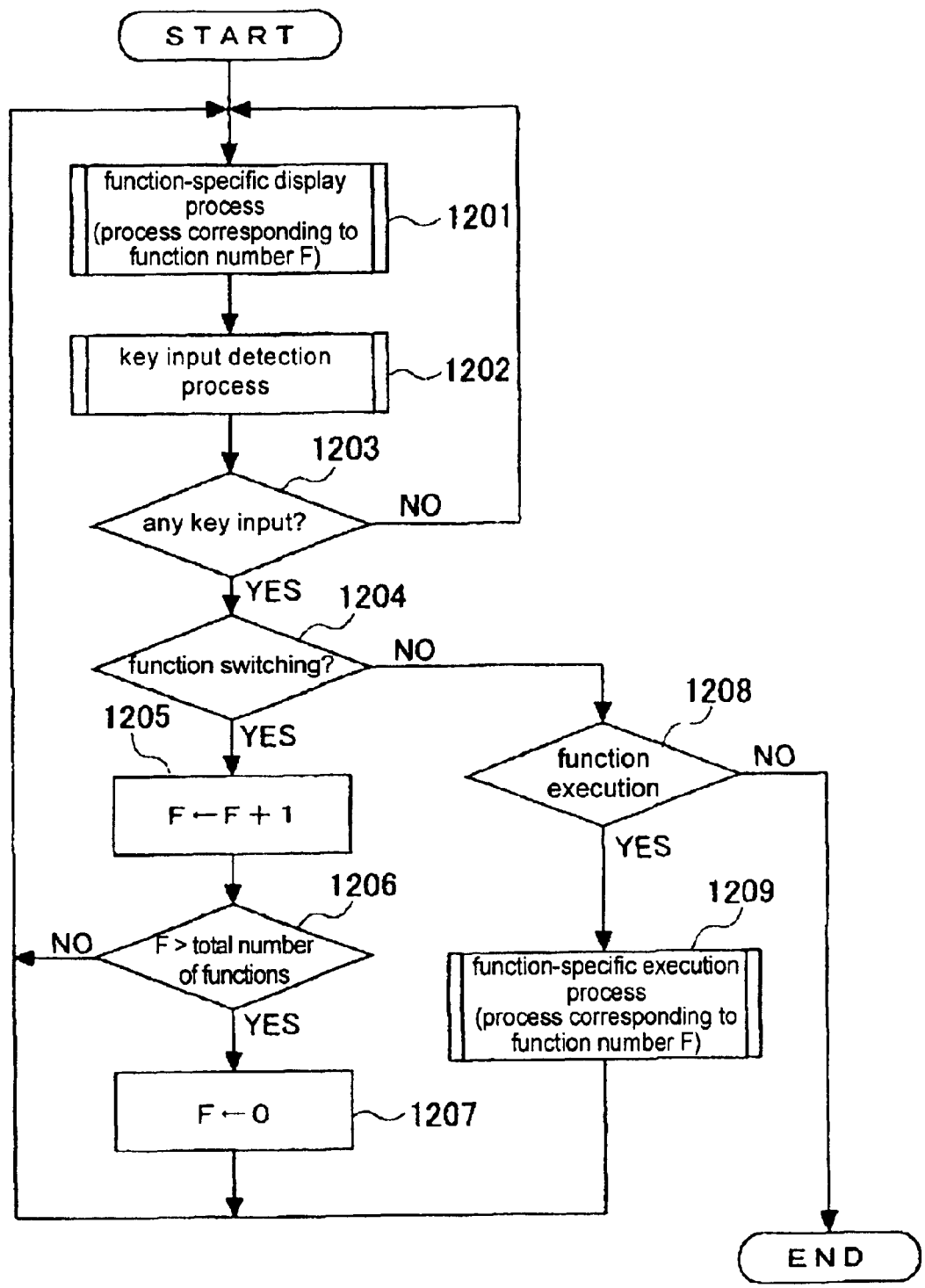
FIG. 12 is a flowchart depicting the entire SET mode process.

A flowchart depicting the entire SET mode process is shown in FIG. 12 and a table describing each process in the SET mode process of FIG. 12 is shown in FIG. 19. As shown in these drawings, when the SET mode process gets started, a function-specific display process (Step 1201) is executed to control the indicator lights, thereby performing display in accordance with the set function number (F).

Later, the key input detection process (Step 1202) is executed, and key inputs are detected at the regular time intervals. When a key input has been detected, a setting is performed to execute the appropriate process. The key input is detected via the operation of the UP button 205, the DOWN button 206, the MODE button 207, and the sliding operators 208 and 209. After this, a key input standby state is on (Step 1203: NO).

In this condition, if it has been determined that there is a key input (Step 1203: YES) and that the key input indicates an instruction of function switching (Step 1204: YES), the value of the function number (F) is incremented by +1 at a time (Step 1205) until the maximum value is reached (Step 1206: NO). Every time the maximum value is reached (Step 1206: YES), the value is reset to zero (Step 1207). Through the operator's operation of the UP button 205 shown in FIG. 2, the desired function can be selected while changing the function number (F).

On the other hand, if the operator selects the function number (F) and then instructs the execution of the function by manipulating the MODE button 207 or the like (Step 1204: NO, 1208: YES), a function-specific execution process is performed (Step 1209). In this function-specific execution process (Step 1209), the process corresponding to the set function number (F) is executed, and when the function can handle the individual setting for each channel, the state of the channel selection switch 209 is detected to perform the process for the corresponding channel.

The relationship between the function number (F) and the function types, and the capability or incapability of the individual setting for each channel are shown in the table of FIG. 20.

As shown in FIG. 20, when the function number (F) is "0", the teaching function is selected. The teaching function performs various types of teaching according to the key input and determines the threshold value. The types of teaching to be employed include various well-known ones such as a teaching without work, a teaching with work, and a maximum sensitivity setting. In this example, the individual setting of the teaching function for each channel is possible. For example, this enables the first channel to perform a teaching without work and the second channel to perform a teaching with or without work at the same time, or enables the first and second channels to have different threshold values from each other. Consequently, it becomes possible for one sensor unit to handle two channels, while employing different types of teaching from channel to channel, thereby realizing the same function as using two one-channel sensor units.

When the function number (F) is "1", the operation mode setting function is selected. The operation mode setting function can set the operation modes such as a light-entering ON mode or a light-shading ON mode. The operation mode setting function can also be individually set for each channel. As a result, in a sensor unit having two channels, different operation modes can be set from channel to channel; for example, the first channel can be set to the light-entering ON mode and the second channel can be set to the light-shading ON mode. This structure also enables one sensor unit to handle two channels, thereby realizing the same function as using two one-channel sensor units.

When the function number (F) is "2", the detection function setting function is selected. The detection function setting function realizes the selection of detection functions. The detection algorism at the time of determining between ON and OFF differs depending on the selection by this function. The detection functions include a standard mode, a top-speed mode, a high precision mode, and the like. In the present embodiment, this detection function setting function cannot be individually set for each channel.

When the function number (F) is "3", the timer function setting function is selected. The timer function setting function sets a timer mode and the time set by the timer. Through these settings, the output timing at the time of determining between ON and OFF is set. The timer modes include a timer off, an off delay, an on delay, a one shot, and the like. The time set by the timer has specifications which allow the setting within a certain range, besides the timer off. This timer function setting function can also be individually set for each channel. This structure realizes the selection of various setting contents; for example, the timer mode can be set to the off delay in the first channel and to the on delay in the second channel. From this viewpoint, the sensor unit provided with two channel's worth of function can set the timer function from channel to channel, thereby becoming easy to use.

When the function number (F) is "4", the display content setting function is selected. In the display content setting function, one of the display contents is selected. The display contents include the amount of received light, threshold value, bar display, and the like. It is possible to display the above-mentioned display contents in combination, or to display the hold value (peak, bottom, or the like) of the respective contents. It must be noted that the display content setting function cannot be individually set for each channel.

When the function number (F) is "5", the key function assignment setting function is selected. The key function assignment setting function selects the role of the key in the RUN mode. The key assignments include power tuning and zero reset. The key function assignment setting function cannot be individually set for each channel.

When the function number (F) is "6", the power tuning target value setting function is selected. The power tuning target value setting function sets the target value at the time of executing the power tuning. The power tuning target value setting function cannot be individually set for each channel.

When the function number (F) is "7", the display direction setting function is selected. The display direction setting function selects a display direction. When "normal" is set, display appears in the normal direction, and when "reverse" is selected, display appears in the reverse direction. The display direction setting function cannot be individually set for each channel.

When the function number (F) is "8", the output content setting function is selected. The output content setting function sets the output contents on the second channel in a two-output sensor unit. The output contents include a normal independent output, an AND output, an OR output, and a difference output. Although it is not necessary to explain the normal independent output, when the AND output is selected, the AND of the first channel detection output and the second channel detection output is calculated and outputted to a specific output line. When the OR output is set, the OR of the first channel detection output and the second channel detection output is calculated and transmitted to a specific output line. When the difference output is set, the difference between the amount of received light of the first channel and the amount of received light of the second channel is calculated, the obtained difference output is compared with the predetermined threshold value, and the comparison results are transmitted to a specific output line. In this manner, according to whether the deviation between the amount of received light of the first channel and the amount of received light of the second channel exceeds the prescribed threshold value or not, the determined results are outputted to a specific output line. This difference calculation is, as will be explained later at the time of executing the RUM mode, performed by the microprocessor that composes the control part (CPU) 701. It goes without saying that a similar function can be realized by employing the structure where a separate analog calculation circuit such as an OP amplifier is provided to perform its calculation outside the control part (CPU) 701, and the calculation results are discriminated by an analog comparator. Concerning this difference output, there is a conventional sensor system in which the difference between adjacent two photoelectric sensor units is taken in by either one of the sensor units via their communication and after logical discrimination, either sensor unit outputs the results. Unlike the sensor unit with this structure, the two-channel sensor unit of the present invention does not require a communication between adjacent sensor units, thereby improving output responding performance and also realizing high-level discrimination output because the absence of communication produces sufficient time for it. Back to the flowchart of FIG. 12, even if a key input is detected (1203: YES), unless it is not related to the SET mode process, the SET mode process is skipped (1204: NO, 1208: NO), and another process is executed.

Back to FIG. 11, when it has been determined that the state of the SET/RUN selection switch 208a is "RUN" (Step 1102: RUN), the RUN mode initial setting process (Step 1106) is executed. The RUN mode initial setting process (Step 1106), as shown in FIG. 18, performs the initialization of the indicator lights and control putouts, the initialization of the threshold values and the set values for the RUN modes, and the initialization of the light-emitting and light-receiving channel number C (C=1). The value of the light-emitting and light-receiving channel number C is used for the control of which detection channel of operation should be done in the RUN mode which will be described later. In this embodiment, since the first channel system and the second channel system are executed alternately by time sharing in the single CPU, which channel system should be executed is determined depending on the value of the light-emitting and light-receiving channel number C.

Hereafter, as long as the contents of the SET/RUN selection switch 208a are determined to be "RUN" (Step 1108: YES), the RUN mode process (Step 1107) is continuously executed.

Figure 13:
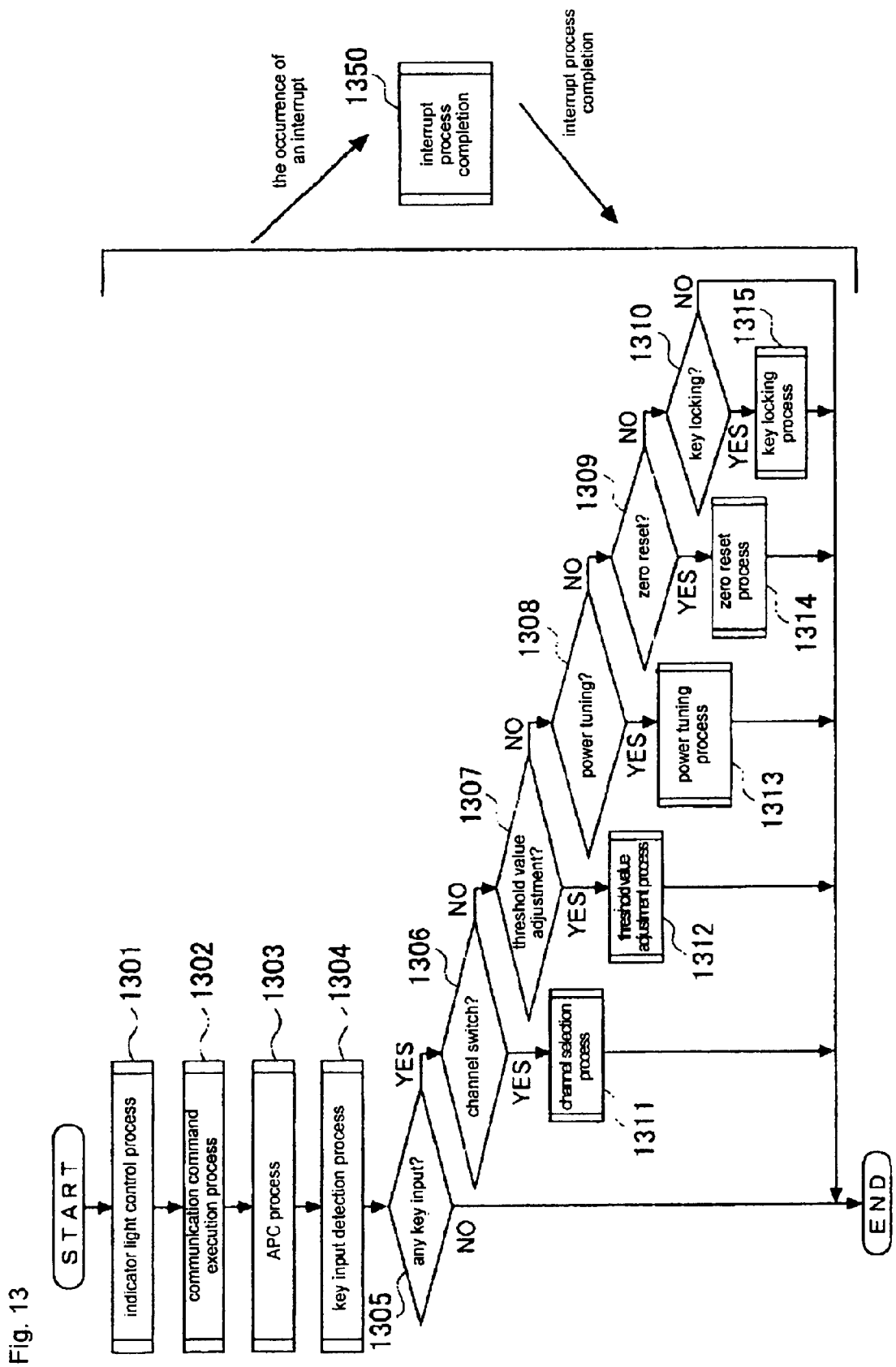
FIG. 13 is a flowchart depicting the entire RUN mode process.

A flowchart depicting the entire RUN mode process is shown in FIG. 13, and a table describing each process in the RUN mode process is shown in FIG. 21. In FIG. 13, first of all, the indicator light control process is executed (Step 1301). In this indicator light control process (Step 1301), the illumination control of the 7-segment display device is performed according to the designated display contents. The "designated display contents" indicates the display contents including the amount of received light, the threshold value and the bar display which are determined when the display content setting function is selected by setting the function number (F) to "4" in the previous SET mode process (Step 1104).

Next, a communication command execution process (Step 1302) is executed. The communication command execution process (Step 1302) indicates that when a communication command is received in the later-described instrumentation interrupt process (Step 1350), the process of the appropriate command is executed. As the applicant of the present application has disclosed in Japanese Laid-open Patent Application No. 2001-222788, there area data setting command, an operation incapable command, a hidden function execution command, and the like. Next, in the APC process (Step 1303), the monitoring amount of received light acquired in the instrumentation interrupt process (Step 1350) which will be described later is monitored, and APC (Auto Power Control "the power control of light-emitting current) amendment is applied at the regular time intervals. Since the APC amendment is executed from channel to channel, even when the characteristics of the light-emitting and light-receiving elements or the light-emitting and light-receiving circuits are different from channel to channel, proper auto power control is performed for each channel.

Next, in the key input detection process (Step 1304), key inputs are detected at the regular time intervals, and when a key input has been detected, a setting is performed for the execution of the appropriate process. Later, based on the state of the detected key input, it is determined whether the content instructed by the key input is a channel selection instruction (Step 1306), a threshold value adjustment instruction (Step 1307), a power tuning instruction (Step 1308), a zero reset instruction (Step 1309), or a key locking instruction (Step 1310). Depending on the determination results, the appropriate one of the following processes is executed: the channel selection process (Step 1311), the threshold value adjustment process (Step 1312), the power tuning process (Step 1313), the zero reset process (Step 1314), and the key locking process (Step 1315).

When the channel selection process (Step 1311) has been executed, the designated channel is selected according to the key input. To be more specific, in FIGS. 1 and 2, if the sliding operator 209 is set to either of the first and second channels, the setting state is read via the channel selection switch 209a, and the designated channel is selected.

When the threshold value adjustment process (Step 1312) has been executed, the threshold value is changed according to the key input, and the appropriate threshold value adjustment process is performed for the designated channel. In other words, the threshold value is changed according to the prescribed key operation concerning the designated channel, depending on which of the first and second channels the sliding operator 209 is set at that moment.

When the power tuning process (Step 1313) has been executed, the optimum adjustments of the light-emitting power and the light-receiving gain are executed to obtain the target detection value (power tuning execution). On the other hand, when the "power tuning release" has been requested, the state of the light-emitting power and the light-receiving gain in default is resumed (power tuning release). The power tuning execution and the power tuning release are performed for the designated channel, in accordance with the setting state of the channel selection switch 209. This structure enables power tuning to be performed separately for each of the first and second channels, and when the first and second channels differ in the characteristics of light-emitting and light-receiving system, the optimum power tuning is performed from channel to channel, thereby achieving the same usability as in the case where two one-channel sensor units are used.

When the zero reset process (Step 1314) has been executed, the amount of received light at the starting point is so determined that the current display of the amount of received light can be "0". Hereafter, the amount of change from the amount of received light at the starting point is displayed as the amount of received light. According to the amount of received light at the starting point, the threshold value is also shift displayed (zero reset execution). On the other hand, when the "zero reset release" has been requested, the state of the amount of received light display in default is resumed (zero reset release). Since the zero reset execution or the zero reset release can be performed separately to the designated channel in quite the same manner as the previous case, the zero reset from channel to channel can be performed at the same operation intervals as the case where two one-channel sensor units are used. This zero reset process is not explained here because it is disclosed in detail in Japanese Laid-open Patent Application No. 2001-124594 filed by the applicant of the present application.

When the key locking process (Step 1315) has been executed, the "key locking" is set. When this "key locking" has been set, key inputs other than a specific key input cannot be received. On the other hand, when the "key locking release" has been requested, the locking state is released.

The following is a detailed description of the instrumentation interrupt process (Step 1350) executed at regular interrupts. A flowchart depicting the instrumentation interrupt process is shown in FIG. 14 and a table describing each process in the instrumentation interrupt process is shown in FIG. 22.

Figure 14:
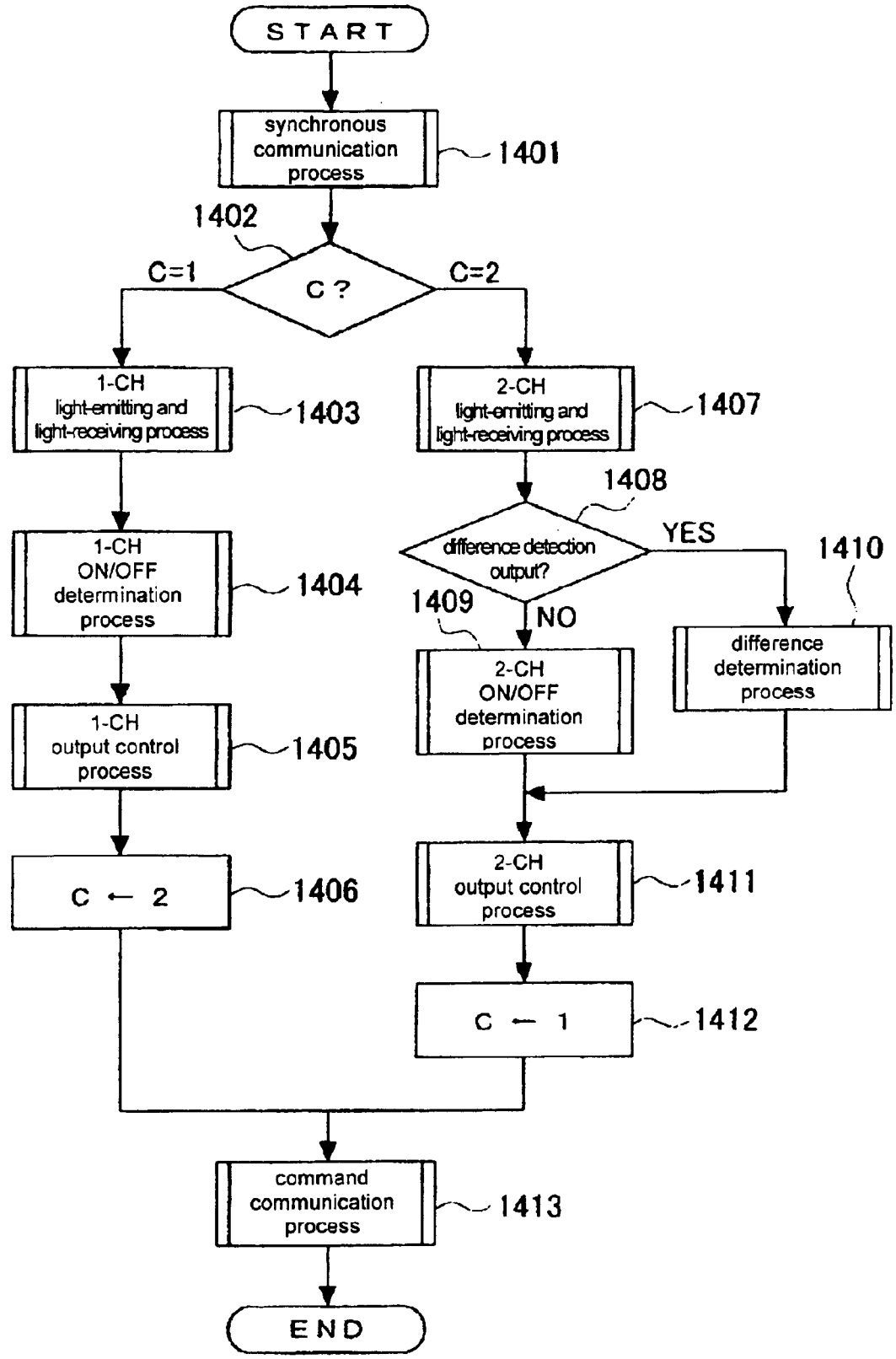
FIG. 14 is a flowchart depicting the instrumentation interrupt process.

In FIG. 14, first of all, the synchronous communication process (Step 1401) is executed. In the synchronous communication process, as shown in FIG. 22, a light-emitting synchronous signal is transmitted to the adjacent sensor unit. As explained earlier with reference to FIGS. 1 and 2, the left-hand and right-hand surface plates 103 and 104 of the main body case 10 of the photoelectric sensor unit 1 each have the window 112 for light emission and light reception. The main body case 10 includes the left-hand communication LED 710a and the left-hand communication PD 711a, or the right-hand communication LED 710b and the right-hand communication PD 711b as explained earlier with reference to FIG. 10. Properly driving these LEDs and PDs enables the sensor unit to exchange information with the adjacent sensor unit via optical communication. The exchange of information is disclosed in detail in Japanese Laid-open Patent Application No. 2001-222786 earlier filed by the applicant of the present application. Thus, in this synchronous communication process (Step 1401), the parent sensor unit positioned at the end of a series of linked sensor units transmits a light-emitting synchronous signal to the adjacent child sensor unit at the regular time intervals by a regular timer process. Each child sensor unit transfers the light-emitting synchronous signal to the next child sensor unit one after another with a constant delay time. As a result, in the parent sensor unit and each of the child sensor units linked to the parent sensor unit can acquire the operation timing by which it should operate with a minor phase delay in a cycle of 100 psec, for example.

Thus, when it has been determined that the operation timing of its own has arrived as the result of the execution of the synchronous communication process (Step 1401), the contents of the channel set at that moment are determined based on the contents of the channel setting register C. When "C=1", it is determined that the first channel has been set, and when "C=2", it is determined that the second channel has been set.

As a result of referring to the value of the channel designation register C, when it is determined that the value is "1", the first channel system process is performed hereafter, whereas when it is determined that the value is "2", the second channel system process is performed.

Assuming that the value of the channel designation register C has been determined to be "1" (Step 1402: C=1), the light-emitting and light-receiving process about the first channel is executed (Step 1403). In the light-emitting and light-receiving process about the first channel (Step 1403), the illumination of the first-channel light-emitting LED 702$a$ is controlled according to the set detection mode, and the amount of received light obtained via the main light-receiving PD 703$a$ in that condition is converted to an electric signal and amplified. Later, A/D conversion is executed via the A/D converter 708 so as to acquire the detection value. The detection value thus detected is used for the display in the ON/OFF determination process or in the RUN mode process about the first channel.

Next, an ON/OFF determination process about the first channel (Step 1404) is executed. In the ON/OFF determination process about the first channel (Step 1404), the acquired detection value is compared with the threshold level, thereby determining between ON and OFF of the first channel according to the set detection function, timer mode and operation mode (L. ON/D. ON).

Then, an output control process about the first channel (Step 1405) is executed. In the output control process about the first channel (Step 1405), the output control of the first-channel control output and the illumination control of the operation indicator light are performed according to the ON/OFF state of the first channel. In this case, the transmission of the control output of the first channel to outside is performed via the first-channel control output circuit 715 shown in FIG. 10, and the illumination control of the operation indicator light 203 is performed via the display drive circuit 719.

After the output control process about the first channel (Step 1405) is complete, the value of the channel designation register is changed from "1" to "2" (Step 1406). Hereafter, a command communication process (Step 1413) is executed, and when a command communication is received through communication, the received contents are stored and the command is forwarded to the adjacent sensor unit.

When the next interrupt process has been executed, in the synchronous communication process (Step 1401), as soon as the operation timing arrives, the contents of the channel designation register C are determined (Step 1402). At this moment, since the value of the channel designation register C has been changed from "1" to "2" in the previous interrupt process (Step 1406), it is determined that C=2 in the determination process this time (Step 1402). As a result, the light-emitting and light-receiving process about the second channel (Step 1407) is executed.

In the light-emitting and light-receiving process concerning the second channel (Step 1407), the illumination control of the second-channel light-emitting LED 702$b$ is performed according to the set detection mode; the amount of received light obtained via the main light-receiving PD 703$b$ is converted to an electric signal and amplified; and then A/D conversion is executed via the A/D converter 708 so as to acquire the detection value. The detection value thus obtained is used for the display in the ON/OFF determination process or in the RUN mode process about the second channel.

When the light-emitting and light-receiving process about the second channel (Step 1407) has been complete, it is determined whether a difference detection output has been set or not (Step 1408). The designation of a difference detection output, as described earlier, can be performed by setting the function number (F) to "8" and selecting the output content setting function in the SET mode process (Step 1104). If it has been determined that there is no designation of a difference detection output (Step 1408: NO), then the ON/OFF determination process about the second channel (Step 1409) is executed.

In the ON/OFF determination process about the second channel (Step 1409), the acquired detection value is compared with the threshold level so as to perform the ON/OFF determination of the second channel according to the set detection function, timer mode, and operation mode (L. ON/D. ON).

On the other hand, when it has been determined that there is difference detection output designation (Step 1408: YES), the difference determination process (Step 1410) is executed. In the difference determination process (Step 1410), the value obtained by subtracting the amount of received light of the second channel from the amount of received light of the first channel is compared with the threshold level so as to perform the ON/OFF determination of the second channel according to the timer mode and operation modes (L. ON/D. ON). In this manner, the difference determination process makes it possible to find the difference in the amount of received light between the two channels in a single sensor unit and to generate a determination output depending on whether this difference exceeds the predetermined threshold value or not.

Next, the output control process about the second channel (Step 1411) is executed. In the output control process (Step 1411), the output control of the second-channel control output and the illumination control of the operation indicator light are performed according to the output content setting in the SET mode. As explained earlier with reference to FIG. 20, the output content setting is composed of a normal independent output, an AND output, an OR output, and a difference output. In the "normal independent output", the results of the ON/OFF determination about the second channel are outputted. In the "AND output", the AND output of the results of the ON/OFF determination of the first and second channels is outputted. In the case of the "OR output", the OR output of the results of the ON/OFF determination of the first and second channels is generated and transmitted outside. In the "difference output", the determination results obtained in the difference determination process (Step 1410) is outputted.

Immediately after the output control process about the second channel (Step 1411) is complete, the value of the channel designation resister C is changed from "2" to "1" (Step 1412). Later, a command communication process (Step 1413) is executed, and when a command communication is received through communication, the received contents are held and the command is transmitted to the adjacent sensor unit. After this, when the timer gets started, the process goes to the next instrumentation interrupt process.

As the result of the reference process of the channel designation register C in Step 1402 and the channel designation register rewriting process in Steps 1406 and 1412, the value of the channel designation register C changes between "1" and "2" alternately at every interrupt, whereby the first channel system processes (Steps 1403 to 1405) and the second channel system processes (Steps 1407 to 1411) are executed alternately.

Figure 17:
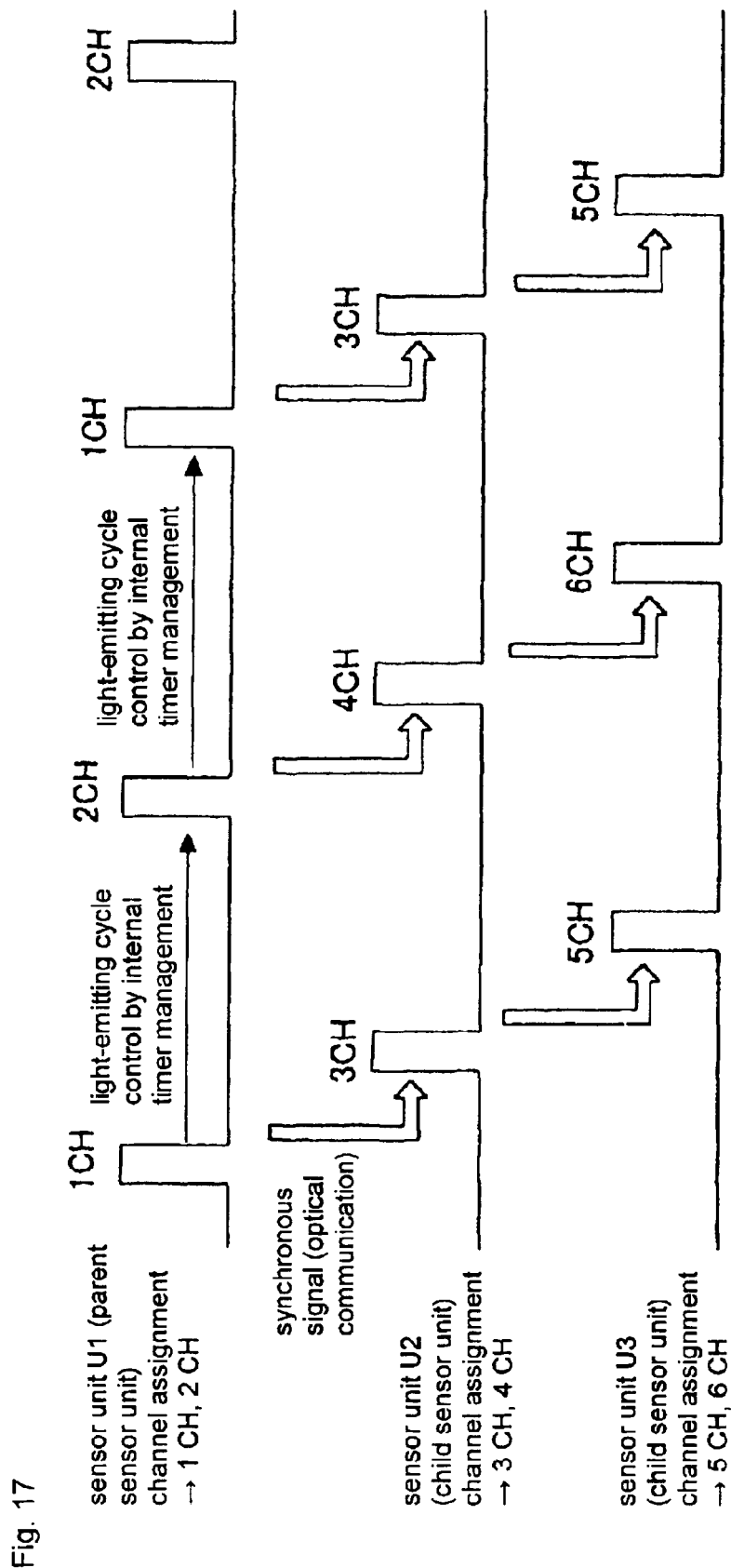
FIG. 17 is a time chart to explain the operation timings of the two channels assigned to each of the sensor units U1, U2 and U3.

Consequently, as shown in FIG. 17, in the sensor system where a number of sensor units are linked via a DIN rail, in the individual two-channel sensor units, the first channel and the second channel are executed alternately with the light-emitting cycle determined by the parent sensor unit disposed therebetween. Hence, like the conventional one-channel photoelectric sensor units, every sensor unit can operate properly without disturbing synchronous control.

In other words, although one sensor unit has two channels therein, only one channel operates in one operation cycle in each sensor unit. Therefore, in a sensor system where the maximum number of sensor units to be linked together is limited to 8, 16, 32, etc. in accordance with the operation cycle determined by the parent sensor unit, when one or all of the sensor units is the two-channel sensor unit of the present invention, the two channels in a single sensor unit operate concurrently with a minor delay time close to the end of one operation cycle, thereby preventing the operation period of the final sensor unit from exceeding the cycle and from disturbing the entire system.

FIG. 17 indicates that when three sensor units (sensor units U1, U2, and U3) are taken up as examples of two-channel sensor units, they can operate properly while keeping the cycle time of the conventional one-channel sensor units.

The sensor unit U1 of the parent sensor unit is assigned 1 CH and 2 CH, and the sensor unit U2 as a child sensor unit is assigned 3 CH and 4 CH, and the other child sensor unit U3 is assigned 5 CH and 6 CH. In this condition, the sensor unit U1 of the parent sensor unit takes the initiative in transmitting a synchronous signal in a fixed cycle to the sensor unit U2 which is the adjacent sensor unit. In the sensor unit U2, a detecting operation about 3 CH is performed and then the synchronous signal is transmitted via an optical communication from the sensor unit U2 to the sensor unit U3. In the sensor unit U3, a detecting operation about 5 CH is performed. Later, when the synchronous cycle has passed, in the sensor unit U1, a detecting operation about 2 CH is executed under the control of the timer, and the synchronous signal is transmitted to the sensor unit U2 with a minor delay. Then, in the sensor unit U2, a detecting operation about 4 CH is executed, and the synchronous signal is transmitted via an optical communication to the sensor unit U3 with a minor delay. Then, in the sensor unit U3, a detecting operation about 6 CH is executed. When the light-emitting cycle by the internal timer control has passed, the sensor unit U1, which is the parent sensor unit, executes a detecting operation about 1 CH. With a minor delay, the synchronous signal is transmitted to the sensor unit U2 by an optical signal. In the sensor unit U2, a detecting operation about 3 CH is executed, and with a minor delay the synchronous signal is transmitted to the sensor unit U3 by an optical communication. In the sensor unit U3, a detecting operation about 5 CH is executed. Hereafter, in each of the sensor units U1, U2, and U3, adjacent two channels are executed alternately. Thus, each sensor unit having two channels therein takes up the same time length as the one-channel sensor units. Therefore, as long as the maximum number of sensor units to be linked is maintained, the number of sensor units to be linked can be increased to the prescribed maximum number so as to double the number of channels that can be handled while keeping the width taken up by the sensor units constant.

Figure 15:
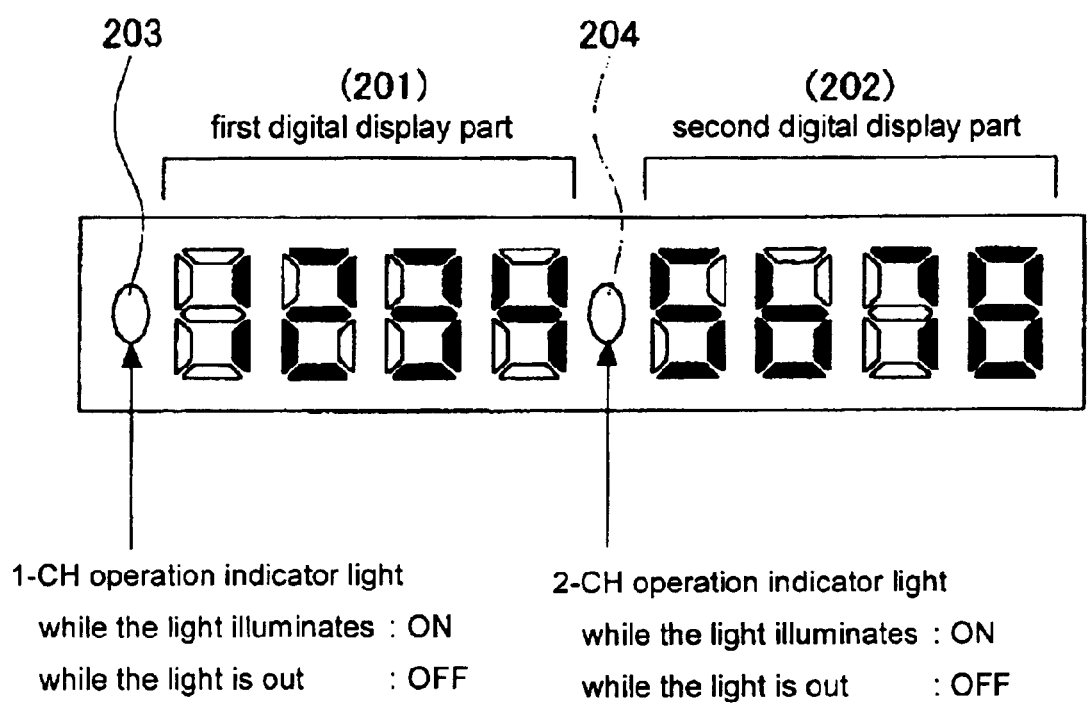
FIG. 15 is an enlarged view of the entire display part shown in detail.

In the end, an enlarged view of the entire display part shown in detail in FIG. 15, and a view of display forms of the first and second digital display parts is shown in FIG. 16.

The present invention can make the best use of the first digital display part 201 and the second digital display part 202 to acquire various display forms about the first channel and the second channel.

As shown in FIG. 16A, when <the amount of received light+the amount of received light> display is selected, the amount of received light of the first channel is displayed as "1000" on the first digital display part 201, and the amount of received light of the second channel is displayed as "3000" on the second digital display part 202.

As shown in FIG. 16B, when the channel selection switch 209*a* is set to the first channel, if <the amount of received light+threshold value> display is selected, the amount of received light of the first channel is displayed as "4000" on the first digital display part 201, and at the same time the threshold value of the first channel is displayed as "1800" on the second digital display part 202.

As shown in FIG. 16C, when the channel selection switch 209*a* is set to the second channel side, if <the amount of received light+threshold value> display is selected, the amount of received light of the second channel is displayed as "3000" on the first digital display part 201, and the threshold value of the second channel is displayed as "700" on the second digital display part 202.

As shown in FIG. 16D, if <bar> display is selected, the first digital display part 201 bar-displays the light amount on the light-entering side of each channel by dividing the region vertically, and at the same time the second digital display part 202 bar-displays the light amount on the light-shading side of each channel by dividing the region vertically.

As shown in FIG. 16E, for example when the channel selection switch 209*a* is set to the second channel side, if <the amount of received light difference value+threshold value> display is selected, the difference between the amount of received light of the first channel and the amount of received light of the second channel is displayed as "+300" on the first digital display part 201, and the difference threshold value is displayed as "-500" on the second digital display part 202.

As shown in FIGS. 16A to 16E, according to the present invention, it becomes possible to display various data such as the amount of received light, threshold value, and difference for the operator to understand easily by making use of the two digital display parts 201 and 202, while providing two channels' worth of function in a single sensor unit. In addition, not only the digital display but also the light amount on the light-entering side and on the light-shading side of each channel can be bar-displayed as shown in the drawing 16D.

As described in detail hereinbefore, the two-channel optical fiber photoelectric sensor unit of the present embodiment can handle the same amount of channel capacity as the conventional one-channel photoelectric sensor unit by a half space. On the contrary, securing the same space as the conventional system can double the channel capacity. In addition, since the two channels provided in each sensor unit operate alternately one at a synchronous cycle, when it is applied to the conventional one-channel system, it neither disturbs the synchronous cycle nor adversely affects other sensor units. Furthermore, since the two channels do not operate nearly at the same time in the same sensor unit thanks to the presence of a minor time difference, the potential fluctuation of the substrate due to the operation of one channel never affects the operation of the other channel, thereby realizing a sensor system which is highly reliable and easy to use.

Making the best use of the two digital display parts and the two operation indicator lights provided on both sides of the sensor case enables the amounts of received light of both channels to be seen at the same time; the amount of received light and the threshold value about each channel to be observed while being compared with each other; and the light amount data of the two channels to be displayed in bar code by dividing them into two rows of the top and bottom of the digital display parts, thereby providing the operator with excellent usability.

As apparent from the aforementioned description, according to the photoelectric sensor unit of the present invention, one sensor unit can perform two channels' worth of detecting operation; the amount of received light of each channel can be checked in digital number; and one sensor unit can be manufactured at a lower cost than two one-channel sensor units.

What is claimed is:

1. An optical fiber photoelectric sensor unit which includes a rail attachment part on a bottom surface, a display part and an operation part on a top surface, fiber inlets on a front surface, and a cord drawing-out or connector type output part on a rear surface, and which is not more than 15 mm in a longitudinal direction of a rail, said optical fiber photoelectric sensor unit comprising:

two sets of light-emitting and light-receiving circuits corresponding to a first and second detection channels;

a single CPU which performs detecting operations of two detection channels by time sharing;

two output lines corresponding to two detection channels;

four fiber inlets aligned vertically on the front surface, lower two inlets being a pair of light-emitting and light-receiving inlets corresponding to the first detection channel, and the upper two inlets being a pair of light-emitting and light-receiving inlets corresponding to the second detection channel;

a first and second digital display parts which each display a string of digits in a longitudinal direction of a case and which are arranged in the longitudinal direction of the case on the top surface, wherein the first digital display part displays an amount of received light of the first detection channel, and the second digital display part displays an amount of received light of the second detection channel.

2. The optical fiber photoelectric sensor unit according to claim 1, wherein a first operation indicator light is disposed adjacent to the first digital display part, and a second operation indicator light is disposed adjacent to the second digital display part, and one of the first and second operation indicator lights is sandwiched between the first and second digital display parts.

3. The optical fiber photoelectric sensor unit according to claim 1, wherein selecting operation shifts display contents of the first and second digital display parts between the amount of received light of the first detection channel and the amount of received light of the second detection channel; the amount of received light and a threshold value of the first detection channel; and the amount of received light and a threshold value of the second detection channel.

4. The optical fiber photoelectric sensor unit according to claim 1 further comprising: a logical calculation means for performing logical calculation between detection results of the first detection channel and detection results of the second detection channel; and an output line for outputting the logical calculation results of said logical calculation means.

5. The optical fiber photoelectric sensor unit according to claim 1 further comprising a difference calculation means for calculating the difference between the amount of received light of the first detection channel and the amount of received light of the second detection channel;

a discrimination means for discriminating difference calculation results of said difference calculation means by a threshold value; and output lines for outputting discrimination results of said discrimination means.

6. The optical fiber photoelectric sensor unit according to claim 1 further comprising a fiber locking mechanism for concurrently locking four fibers which are inserted into the four fiber inlets vertically arranged by operating a single clamp operator.

7. The optical fiber photoelectric sensor unit according to claim 6, wherein said fiber locking mechanism comprises: a base block having four fiber insertion holes which are vertically arranged at appropriate intervals for receiving tips of the fibers; four flexible C-rings which are fixed to the base block in correspondence to the openings of the four fiber inlets of the base block; a common sliding actuator which is supported on the front surface side of the base block in a vertically slidable manner and which is engaged with the four C-rings to enlarge or reduce a diameter of the four C rings; and a clamp lever which is supported by the base block in a rotatable manner and which makes the sliding actuator slide by rotation.

8. The optical fiber photoelectric sensor unit according to claim 1 further comprising a switching means for switching a detection channel which should perform detection operation between the first detection channel and the second detection channel alternately every time a detection operation timing, which is generated based on an external synchronous signal, arrives.

9. An optical fiber photoelectric sensor unit which includes a rail attachment part on a bottom surface, a display part and an operation part on a top surface, fiber inlets on a front surface, and a cord drawing-out or connector type output part on a rear surface, said optical fiber photoelectric sensor unit comprising:

two sets of light-emitting and light-receiving circuits corresponding to a first and second detection channels;

a single CPU which performs detecting operations of two detection channels by time sharing;

two output lines corresponding to two detection channels;

four fiber inlets arranged on the front surface;

a display device which is disposed on a top surface of a case and which displays a string of digits in a longitudinal direction of the case and also displays an amount of received light of the first detection channel and an amount of received light of the second detection channel in digital numbers.

10. The optical fiber photoelectric sensor unit according to claim 9, wherein a size of the optical fiber photoelectric sensor unit in a longitudinal direction of the rail is not more than 15 mm, and the four fiber inlets are arranged vertically on the front surface.

11. The optical fiber photoelectric sensor unit according to claim 10, wherein the four fiber inlets are aligned in such a manner that lower two inlets are a pair of light-emitting and light-receiving inlets corresponding to the first detection channel, and the upper two inlets are a pair of light-emitting and light-receiving inlets corresponding to the second detection channel.

12. The optical fiber photoelectric sensor unit according to claim 9, wherein said display device includes a first and second digital display parts which each display the string of digits in the longitudinal direction of the case and which are arranged in the longitudinal direction of the case, wherein the first digital display part displays an amount of received light of the first detection channel and the second digital display part displays an amount of received light of the second detection channel.

* * * * *